(12) United States Patent
Hunt et al.

(10) Patent No.: US 10,820,513 B2
(45) Date of Patent: Nov. 3, 2020

(54) HARVESTER HEAD REEL REPHASING

(71) Applicant: Deere and Company, Moline, IL (US)

(72) Inventors: Timothy S. Hunt, Davenport, IA (US); Paul D. Marvin, Dewitt, IA (US); Madan M. Rajendran, Bettendorf, IA (US)

(73) Assignee: Deere & Company, Moline, IL (US)

( * ) Notice: Subject to any disclaimer, the term of this patent is extended or adjusted under 35 U.S.C. 154(b) by 375 days.

(21) Appl. No.: 15/640,432

(22) Filed: Jun. 30, 2017

(65) Prior Publication Data

US 2019/0003495 A1 Jan. 3, 2019

(51) Int. Cl.

| A01D 57/04 | (2006.01) |
|---|---|
| A01D 41/14 | (2006.01) |
| F15B 11/22 | (2006.01) |
| F15B 13/02 | (2006.01) |
| A01B 63/10 | (2006.01) |
| A01D 34/43 | (2006.01) |
| A01D 57/12 | (2006.01) |
| F15B 15/14 | (2006.01) |

(Continued)

(52) U.S. Cl.
CPC .............. *A01D 57/04* (2013.01); *A01B 63/10* (2013.01); *A01D 34/43* (2013.01); *A01D 41/141* (2013.01); *A01D 57/12* (2013.01); *F15B 11/22* (2013.01); *F15B 13/021* (2013.01); *F15B 15/149* (2013.01); *F15B 21/08* (2013.01); *A01D 34/04* (2013.01); *F15B 2211/7128* (2013.01); *F15B 2211/765* (2013.01)

(58) Field of Classification Search
CPC ...... A01D 57/02; A01D 57/04; A01D 41/141; F15B 11/024; F15B 11/22; F15B 15/149; F15B 13/021

USPC .......................................................... 91/171
See application file for complete search history.

(56) References Cited

U.S. PATENT DOCUMENTS

| 4,335,894 A | 6/1982 | Swanson |
|---|---|---|
| 4,407,109 A | 10/1983 | Swanson et al. |

(Continued)

FOREIGN PATENT DOCUMENTS

| DE | 3605933 | 8/1987 |
|---|---|---|
| DE | 102015109191 | 12/2015 |

(Continued)

OTHER PUBLICATIONS

European Search Report for 18179534.5-1006 dated Nov. 21, 2018.
EP Search Report for 18179536 dated Oct. 12, 2018.

*Primary Examiner* — Alicia Torres
(74) *Attorney, Agent, or Firm* — Rathe Lindenbaum LLP

(57) ABSTRACT

A rephasing system may include a first hydraulic cylinder, a second hydraulic cylinder, a first rephasing valve, a second rephasing valve and a controller. The first hydraulic cylinder and the second hydraulic cylinder include first and second pistons, respectively. A first hydraulic fluid line connects a hydraulic supply to a first side of the first piston while a second hydraulic fluid line connects a second side of the first piston to a first side of the second piston. The first rephasing valve fluidly couples the first side of the first piston to the first side of the second piston while the second hydraulic fluid line fluidly couples the second side of the second piston to the hydraulic supply. The controller selectively opens and closes the first and second rephasing valves to re-phase the first and second pistons.

14 Claims, 11 Drawing Sheets

(51) Int. Cl.
*F15B 21/08* (2006.01)
*A01D 34/04* (2006.01)

(56) References Cited

U.S. PATENT DOCUMENTS

| | | | |
|---|---|---|---|
| 4,655,031 A | | 4/1987 | Kucera |
| 4,715,172 A | | 12/1987 | Mosby |
| 5,178,402 A | * | 1/1993 | Love .................. A01D 75/28 |
| | | | 180/41 |
| 5,311,808 A | | 5/1994 | Ando |
| 5,449,042 A | | 9/1995 | Landphair et al. |
| 6,000,315 A | | 12/1999 | Graham et al. |
| 6,029,450 A | * | 2/2000 | Wittich ................ F15B 7/005 |
| | | | 60/571 |
| 6,698,817 B1 | * | 3/2004 | O'Brian ............... B60J 7/0576 |
| | | | 296/98 |
| 7,478,683 B2 | | 1/2009 | Peck et al. |
| 7,669,392 B2 | | 3/2010 | Ehrhart |
| 7,717,025 B2 | | 5/2010 | Webster et al. |
| 9,127,695 B2 | | 9/2015 | Lougheed |
| 9,926,007 B2 | * | 3/2018 | Maniar ................. B62D 5/28 |
| 2002/0170785 A1 | | 11/2002 | Stockmann |
| 2006/0213715 A1 | | 9/2006 | Krieger |
| 2007/0170669 A1 | * | 7/2007 | Ehrhart ............... A01D 34/283 |
| | | | 280/43.23 |
| 2015/0156948 A1 | | 6/2015 | Henry |
| 2016/0205862 A1 | | 6/2016 | Sudbrink et al. |

FOREIGN PATENT DOCUMENTS

| | | | |
|---|---|---|---|
| EP | 0326836 | 8/1989 | |
| EP | 2253195 | 11/2010 | |
| GB | 500673 A * | 2/1939 | ............. F15B 11/22 |

\* cited by examiner

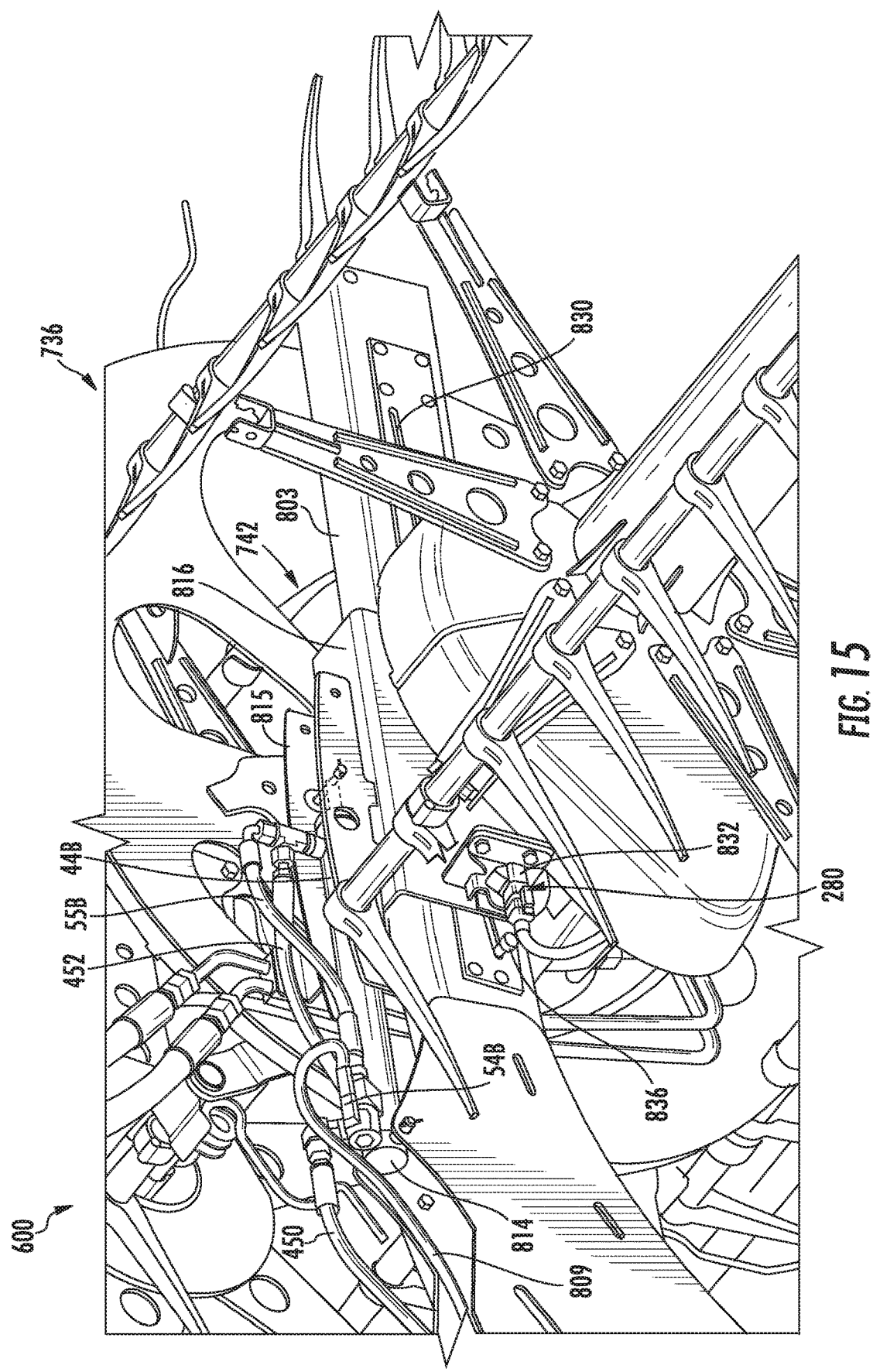

_US 10,820,513 B2_

HARVESTER HEAD REEL REPHASING

CROSS-REFERENCE TO RELATED PATENT APPLICATIONS

The present application is related to co-pending U.S. patent application Ser. No. 15/640,435, filed on Jun. 30, 2017 by Hunt et al. and entitled HARVESTER HEAD REEL SEGMENTS SYNCHRONIZATION, the full disclosure of which is hereby incorporated by reference.

BACKGROUND

Harvesters are utilized to gather and harvest a crop. Such harvesters may include a head which separates the crop from the underlying growing medium and feeds the crop into the harvester. Depending upon the crop being harvested, such heads may include a cutter bar which severs the crop and a reel which is rotated to move the crops towards the cutter bar and into an auger and/or onto draper belt. During use, the reel may be repositioned in an upward/downward direction or in a rearward/forward direction.

BRIEF DESCRIPTION OF THE DRAWINGS

FIG. 15 is an enlarged fragmentary effective view of a portion of the harvester head of FIG. 10.

DETAILED DESCRIPTION OF EXAMPLES

Figure 1:
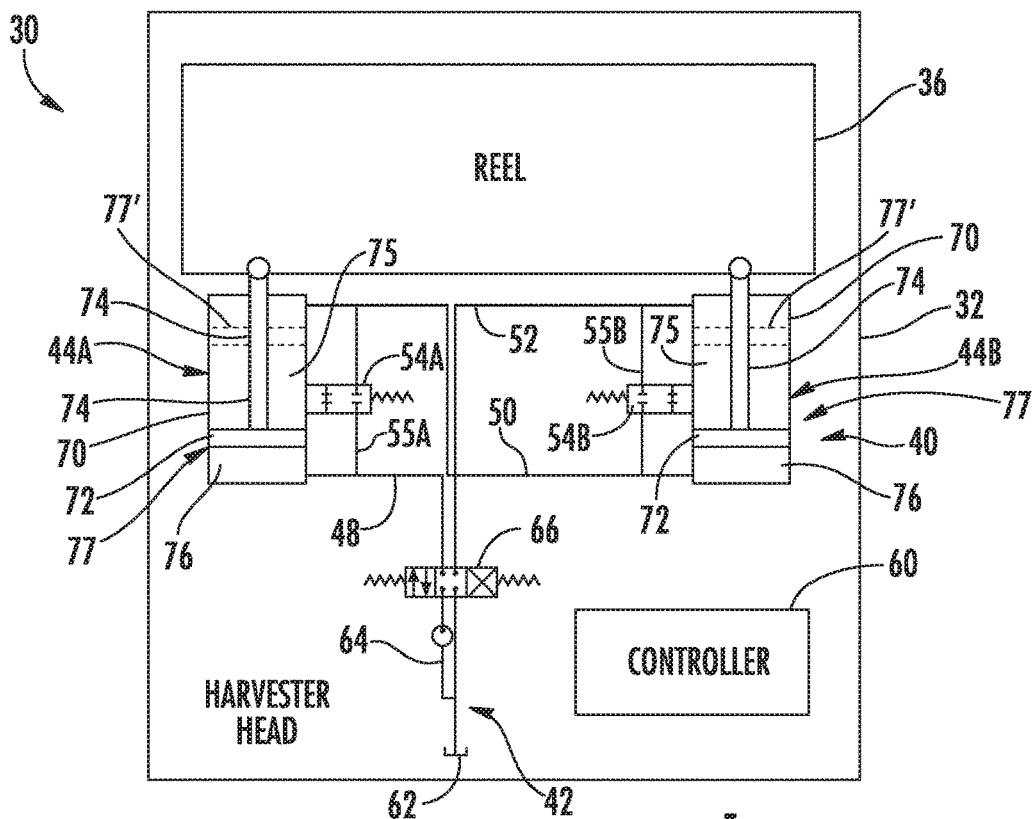
FIG. 1 is a schematic diagram of portions of an example reel positioning system of an example harvester head.

Repositioning of the harvester head reel is sometimes achieved using multiple hydraulic cylinders which reposition different portions of the reel. To maintain the reel in a level orientation and to maintain the reel in an orientation perpendicular to the direction of travel of the harvester, the hydraulic cylinders operate in phase with one another. In other words, actuation of such hydraulic cylinders results in equal movement of their respective portions of the reel. During use, the multiple hydraulic cylinders may become "out of phase" with respect to one another. This may result in the reel becoming canted or angled in a fore-aft direction or in a vertical direction.

Disclosed herein are examples of a harvester head which assists in maintaining the hydraulic cylinders in phase with respect to one another to maintain a proper orientation of the reel. Disclosed herein are examples of a harvester head which facilitates identification of an out of phase state with respect to the hydraulic cylinders that reposition a reel and actuation of the hydraulic cylinders to return the hydraulic cylinders to an in-phase state. Disclosed herein are examples of a harvester head which facilitates identification of an out of phase state and automatic actuation of the hydraulic cylinders to return the hydraulic cylinders to an in-phase state.

Disclosed herein is an example harvester head which comprises a frame, a position adjustable reel movably supported by the frame, a hydraulic supply comprising a pump and a reservoir, first and second hydraulic cylinders and a controller. The first and second hydraulic cylinders each include a barrel housing and a displaceable piston that separates an interior of the barrel into a first side and a second side. The piston includes a rod that is connected to a portion of the reel.

A first hydraulic fluid line connects the hydraulic supply to the first side of the first hydraulic cylinder while a second hydraulic fluid line connects the second side of the first hydraulic cylinder to the first side of the second hydraulic cylinder. A first selectively actuatable rephasing valve fluidly couples the first side of the first hydraulic cylinder to the first side of the second hydraulic cylinder while a second selectively actuatable rephasing valve fluidly couples the first side of the second hydraulic cylinder to the hydraulic supply. A third hydraulic fluid line connects the second side of the second hydraulic cylinder to the hydraulic supply. A second selectively actuatable rephasing valve fluidly couples the first side of the second hydraulic cylinder to hydraulic supply. The controller controller selectively opens and closes the first selectively actuatable rephasing valve and the second selectively actuatable rephasing valve to re-phase the first displaceable piston and the second displaceable piston with respect to one another.

Disclosed herein is an example method for rephasing hydraulic cylinders of a harvester head reel positioning system. The method may include supplying hydraulic fluid under pressure from a hydraulic pump to a first side of a first displaceable piston in a first hydraulic cylinder to displace the first displaceable piston and move a first portion of harvester head reel. The method further includes transferring hydraulic fluid from a second side of the displaceable piston in the first hydraulic cylinder to a first side of a second displaceable piston in a second hydraulic cylinder to displace the second displaceable piston to move a second portion of the harvester head reel. The first displaceable piston and the second displaceable piston are rephased relative to one another by selectively actuating a first rephasing valve to deliver hydraulic fluid from the first side of the first displaceable piston to the first side of the second displaceable piston and by selectively actuating a second rephasing valve to deliver hydraulic fluid from the first side of the second displaceable piston to a hydraulic reservoir.

Disclosed herein is an example agricultural hydraulic cylinder rephasing system that comprises a hydraulic supply comprising a pump and a reservoir, first and second hydraulic cylinders, a sensor and a controller. The first and second hydraulic cylinders each comprise a barrel housing a displaceable piston separating an interior of the barrel into a rod side and a cap side with the displaceable piston having a t rod connected to a portion of the reel.

A first hydraulic fluid line connects the hydraulic supply to the rod side of the first hydraulic cylinder. A second hydraulic fluid line connects the cap side of the first hydraulic cylinder to the rod side of the second hydraulic cylinder. A first selectively actuatable rephasing valve fluidly couples the rod side of the first hydraulic cylinder to the rod side of the second hydraulic cylinder. A second selectively actuatable rephasing valve fluidly couples the cap side of the second hydraulic cylinder to the hydraulic supply. The sensor senses a position of one of the first displaceable piston and the second displaceable piston. The controller selectively actuates the first rephasing valve and the second rephasing valve based upon signals from the sensor.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

FIG. 1 schematically illustrates portions of an example harvester head 30 for being carried by a harvester. Head 30 interacts with a crop being harvested to facilitate its separation from a growing medium in the directing of the separated crop into the harvester. Head 30 comprises frame 32, reel 36 and reel positioning system 40. Frame 32 comprises a structure which movably supports reel 36. In one implementation, frame 32 is removably mountable to a harvester. In another implementation, frame 32 is fixedly joined to the remainder of a harvester.

Reel 36 comprises a wheel-like structure that is rotatably supported relative to frame 32 so as to gather and direct crop into header 30. Reel 36 is adjustable between a plurality of positions so as to move the rotational axis of reel 36. In one implementation, reel 36 is movable in a fore-aft (forward-rearward) direction as well as a vertical (upward-downward) direction relative to frame 32. In one implementation, reel 36 comprises a plurality of circumferentially spaced bats that are rotated to engage and gather the crop. In one implementation, reel 36 extends across an entire width or swath of harvester head 30. In another implementation, reel 36 comprises just one of many reel segments of a larger overall reel assembly that collectively span the width or swath of the harvester.

Reel positioning system 40 comprises a system that selectively repositions reel 36 relative to frame 32 of head 30. Reel positioning system 40 further maintains reel 36 in a proper orientation through the rephasing of hydraulic cylinders that are used to reposition reel 36. Reel positioning system 40 comprises hydraulic supply 42, hydraulic cylinders 44A, 44B (collectively referred to as hydraulic cylinders 44), hydraulic line 48, hydraulic line 50, hydraulic line 52, rephasing valves 54A, 54B (collectively referred to as rephasing valve 54) and controller 60. Hydraulic supply 42 selectively applies hydraulic fluid, under pressure, to each of hydraulic cylinders 44. Hydraulic supply 42 comprises fluid reservoir 62, fluid pump 64 and two way valve 66.

Hydraulic cylinders 44 are each coupled to different portions of reel 36 so as to reposition such different portions of reel 36. Hydraulic cylinders 44 cooperate with one another to reposition reel 36. In one implementation, hydraulic cylinders 44 reposition reel 36 by raising or lowering reel 36. In another implementation, hydraulic cylinders 44 reposition reel 36 by moving reel 36 in a forward or rearward direction.

Each of hydraulic cylinders 44 comprises a barrel 70, a displaceable piston 72 and a rod 74. Piston 72 is slidably positioned within the interior barrel 70 and separates barrel 70 into two opposite sides 75 of hydraulic cylinder 74, 76. Rod 74 is connected to piston 72 and extends into pivotal connection with the respective portion of reel 36. Each piston 72 and associated rod 74 move between two opposite "end of stroke" positions 77 and 77' (shown in broken lines) within barrel 70. At each end of stroke position, piston 72 of hydraulic cylinder 44A remains between the ports at which lines 48 and 50 connect to barrel 70 so as to not completely occlude or block such ports. Likewise, at each end of stroke position, piston 72 of hydraulic cylinder 44B remains between the ports at which lines 50 and 52 connect to barrel 70 so as to not completely occlude or block such ports.

Hydraulic fluid line 48 connects hydraulic supply 42 to side 76 of hydraulic cylinder assembly 44A. Hydraulic fluid line 50 connects side 75 of hydraulic cylinder 44A to side 76 of hydraulic cylinder 44B. Hydraulic fluid line 52 connects side 75 of hydraulic cylinder 44B to hydraulic supply 42. In the example illustrated, hydraulic fluid lines 48 and 52 are connected to two way valve 66 which is connected to reservoir 62 and pump 64.

Rephasing valves 54 each comprise a valve that is selectively actuatable between a flow blocking state and a pass-through state. Rephasing valve 54A is located along bypass line 55A and fluidly connects or couples sides 74 and 76 of hydraulic cylinder 44A. Likewise, rephasing valve 54B is located along bypass line 55B and fluidly connects or couples sides 74 and 76 of hydraulic cylinder 44B.

Controller 60 comprises a processing unit or other electronic circuitry that controls the operation of positioning system 40. Controller 60 may be in the form of a processing unit that follows instructions contained in a non-transitory computer-readable medium to control the operation of positioning system 40. Controller 60 may be in the form of electronic circuitry or logic elements, such as an application-specific integrated circuit, that controls the operation of positioning system 60. Controller 60 may comprise a combination of both a processing unit that follows instructions and circuitry or logic elements. Controller 60 may be contained in a single unit or may be distributed across multiple controller elements. In one implementation controller 60 is supported by frame 32 of head 30. In another implementation, controller 60 is remotely supported relative to frame 32.

Controller 60 selectively opens and closes rephasing valves 54 to rephase the positions of pistons 72 of cylinders 44 with respect to one another. In one implementation, controller 60 carries out such rephasing at the command or instruction of a person operating the harvester comprising head 30. In another implementation, controller 60 automatically carries out such rephasing in response to signals from at least one sensor. For example, in one implementation, controller 60 carries out rephasing automatically in response to signals from at least one sensor indicating the canting or angling of reel 36. In one implementation, controller 60 carries out rephasing automatically in response to signals from at least one sensor indicating the relative positions of piston 72 and/or rods 74 of cylinders 44A and 44B. In another implementation, controller 60 carries out rephasing automatically in response to signals from at least one sensor indicating an end of stroke position being attained or about to be attained by one of hydraulic cylinders 44.

By way of example, in one circumstance, controller 60 may rephase cylinders 44 to the end of stroke position shown in FIG. 1. In one such circumstance, due to being out of phase with respect to one another, piston 72 of hydraulic cylinder 44A may reach its end of stroke position 77 prior to piston 72 of hydraulic cylinder 44B reaching its end of stroke position 77. Alternatively, piston 72 of hydraulic cylinder 44B may reach its end of stroke position 77 prior to piston 72 of hydraulic cylinder 44A reaching its end of stroke position 77. This out of phase state results in canting or angling of reel 36.

To address this out of phase state, controller 60 is configured to output control signals that actuate each of rephasing valves 54 to the open or pass-through state. Controller 60 further outputs control signals to valve 66 and pump 64 so as to pump hydraulic fluid through hydraulic fluid line 52 to side 75 of hydraulic cylinder 44B. Due to the larger volume of the interior of side 74 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77. Once the end of stroke position 77 is attained by piston 72 of cylinder 44B, the pump hydraulic fluid is diverted across and through rephasing valve 54B through hydraulic line 50 to side 75 of hydraulic cylinder 44A, ensuring that piston 72 of cylinder 44A is also displaced to its end of stroke position 77. Once piston 72 of cylinder 44A has attained its end of stroke position 77, the pump hydraulic fluid begins to pass through rephasing valve 54A or passes through valve 54A at a greater rate into hydraulic line 48 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

As should be appreciated, this process may likewise be carried out to rephase the piston 72 of cylinders 44 at the end of stroke position 77'. For example, due to being out of phase with respect to one another, piston 72 of hydraulic cylinder 44A may reach its end of stroke position 77' prior to piston 72 of hydraulic cylinder 44B reaching its end of stroke position 77'. Alternatively, piston 72 of hydraulic cylinder 44B may regions and the stroke position 77' prior to piston 72 of hydraulic cylinder 44A reaching its end of stroke position 77'. In such a circumstance, controller 60 operates in a fashion similar to that described above but in reverse by outputting control signals to two-way valve 66 (to the left state shown in FIG. 1) such that hydraulic fluid is directed through hydraulic fluid line 52 to side 75 of hydraulic cylinder 44B. Due to the larger volume of the interior of side 74 of barrel 70 of cylinder 44A and the natural fluid resistance in the hydraulic lines of rephasing valve 54A, the pressure of the hydraulic fluid being pumped into side 75 of cylinders 44A initially moves piston 72 of cylinder 44A to its end of stroke position 77'. Once the end of stroke position 77' is attained by piston 72 of cylinder 44A, the pumped hydraulic fluid is diverted across and through rephasing valve 54A through hydraulic line 50 to side 76 of hydraulic cylinder 44B, ensuring that piston 72 of cylinder 44B is also displaced to its end of stroke position 77'. Once piston 72 of cylinder 44B has attained its end of stroke position 77', the pump hydraulic fluid begins to pass through rephasing valve 54B or passes through valve 54B at a greater rate into hydraulic line 52 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

Figure 2:
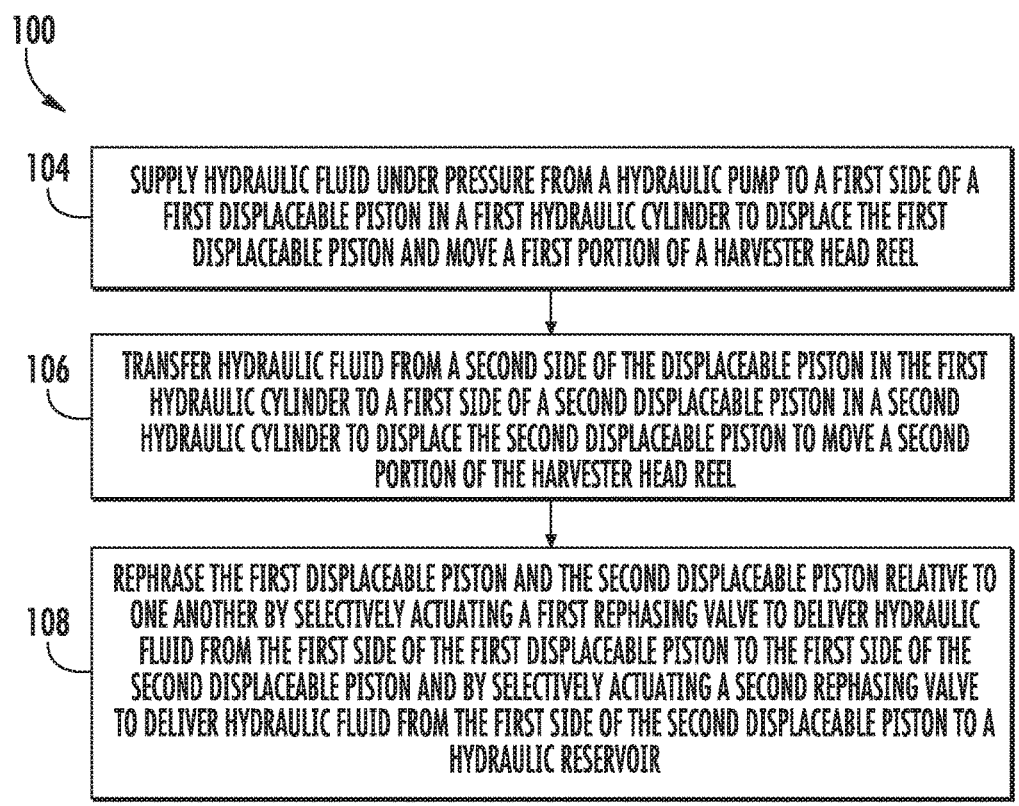
FIG. 2 is a flow diagram of an example method for rephasing hydraulic cylinders of an example reel positioning system of an example harvester head.

FIG. 2 is a flow diagram of an example method 100 for operating a harvester head reel positioning system. Method 100 addresses circumstances where the harvest head reel may be canted or angled due to the positioning hydraulic cylinders being out of phase with respect to one another. Although method 100 is described as being carried out by system 40 in head 30, it should be appreciative that method 100 may be carried out with any of the other harvester heads and positioning system describing this disclosure as well as other harvester heads and reel positioning systems having similar configurations.

As indicated by block 104, controller 60 outputs control signals to pump 64 and valve 66 so as to supply hydraulic fluid under pressure to a first side 74, 76 of a displaceable piston 72 in a hydraulic cylinder 44A, 44B to move a first portion of the harvester head reel 36. As indicated by block 106, hydraulic fluid is further transferred from a second side 74, 76 of the displaceable piston to a first side 74, 76 of a second displaceable piston 72 in a second hydraulic cylinder 44A, 44B to displace a second displaceable piston to move a second portion of the harvester head reel 36.

As indicated by block 108, controller 60 rephases is the pistons 72 of hydraulic cylinders 44 relative to one another by selectively actuating a first rephasing valve MA, MB to deliver hydraulic fluid from the first side 75, 76 of the first displaceable piston 72 to the first side 75, 76 of the second displaceable piston 72 and by selectively actuating a second rephasing valve 54A, 54B to deliver hydraulic fluid from the first side of the second displaceable piston to a hydraulic reservoir 62.

Rephasing actions described above respect to blocks 104, 106 108 may be initiated in response to several triggers. In one implementation, a person or operator may input a command or selection triggering such rephasing. In another implementation, such rephasing may be automatically triggered based upon the sensed positioning of piston 72 and/or rod 74 relative to an end of stroke position for the piston 72 and/or rod 74. In another implementation, such rephasing may be automatically triggered based upon a sensed position and/or orientation of reel 36. In another implementation, such rephasing may be triggered based upon a sensed relative positioning of piston 72 and/or rod 74 of different cylinders 44. In still another implementation, such rephasing may be automatically triggered based upon the receipt of a command instructing the repositioning of piston 72 and such are rod 74 to within a predetermined range of an end of stroke position.

Figure 3:
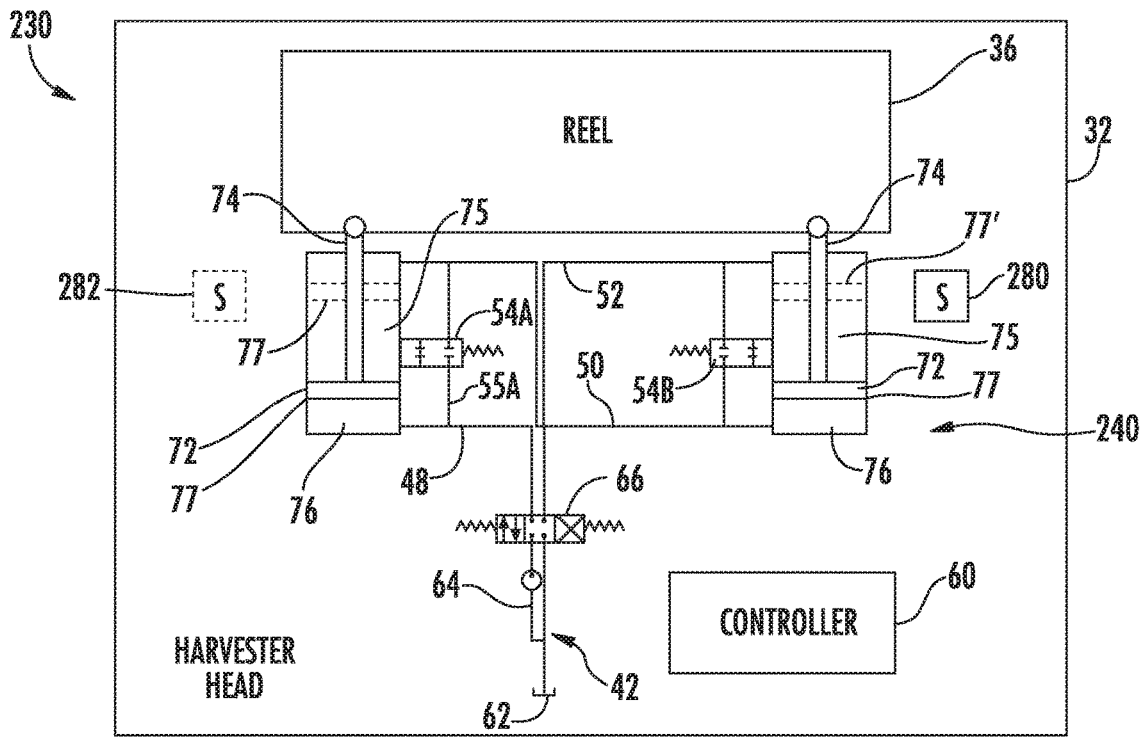
FIG. 3 is a schematic diagram of portions of another example reel positioning system of an example harvester head.

FIG. 3 schematically illustrates portions of another example harvester head 230. Harvester head 230 is similar to harvester head 30 described above except that harvester head 230 comprises a reel positioning system 240 in lieu of reel positioning system 40. Reel positioning system 240 is similar to reel positioning system 40 except that system 240 is specifically illustrated as additionally comprising sensor 280. Those remaining components of system 240 and head 230 which correspond to components of system 40 and head 30 are numbered similarly.

Sensor 280 comprises at least one sensing element that outputs signals that are used to determine when controller 60 rephases pistons 72 of cylinders 44. In one implementation, sensor 280 senses the positioning of piston 72 and/or rod 74 of one of cylinders 44, wherein controller 60 automatically carries out rephasing of the piston 72 in response to the determined position of piston 72 and/or rod 74. For example, in one implementation, sensor 280 may output signals from which controller 60 may determine the positioning of piston 72 and/or rod 74. In such an implementation, in response to the piston 72 and/or rod 74 having a predetermined position, such as a position within a predetermined range of an end of stroke 77 or 77', controller 60 may automatically initiate the above described rephasing.

In another implementation, sensor 280 may sense the positioning of reel 36 and output signals indicating the degree to which reel 36 is level with respect to a horizontal plane, wherein controller 60 automatically initiates the above described rephasing in response to the extent to which reel 36 is not level exceeding a predetermined threshold. In another implementation, sensor 280 senses the positioning of reel 36 and output signals indicating the degree to which reel 36 is perpendicular to the direction of travel of head 230, wherein controller 60 automatically initiates the above described rephasing in response to the extent to which reel 36 is not perpendicular to the direction of travel exceeding a predetermined threshold.

As indicated in broken lines, in some implementations, system 240 may comprise a second sensor or a second sensing element 282 that outputs signals indicating the position of piston 72 and/or rod 74 of a second one of cylinders 44. In such an implementation, controller 60 may utilize such signals to determine the positioning of the piston 72 and/or rod 74 of each of cylinders 44 and to compare the determined positions to identify a degree to which pistons 72 of the different hydraulic cylinders 44 are out of phase with respect to one another. Based upon the comparison, controller 60 may output control signals to carry out the above described rephasing. For example, in one implementation, controller 60 may determine a difference between the positioning of such piston 72 of cylinders 44 and compare the determined different to a predetermined threshold value, wherein rephasing is initiated upon the difference exceeding the predetermined threshold value.

Figure 4:
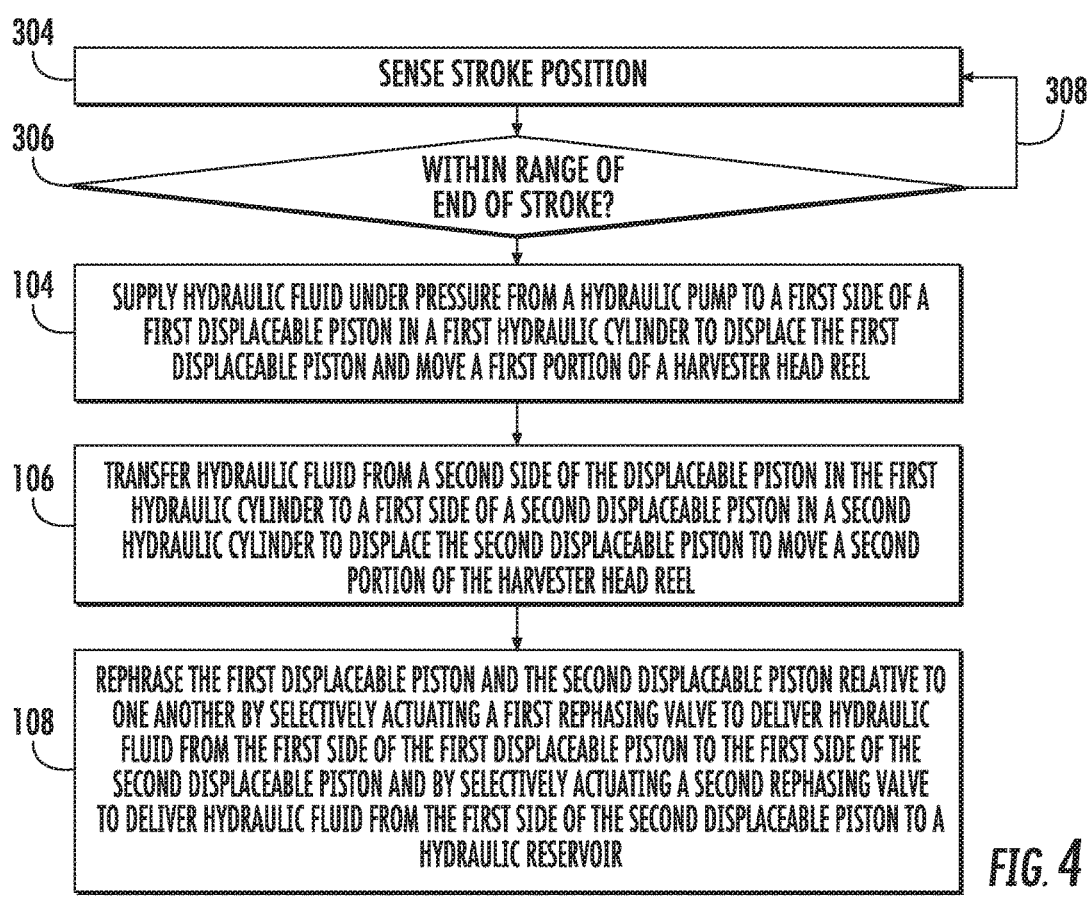
FIG. 4 is a flow diagram of an example method for rephasing hydraulic cylinders of an example reel positioning system of an example harvester head.

FIG. 4 is a flow diagram of an example method 300 that may be utilized to control the positioning of different portions of an agricultural machine member, such as to control the positioning of the harvester head reel. Method 300 carries out the rephasing of hydraulic cylinders that adjusts the positioning of different portions of the harvester head reel. Although method 300 is described as being carried out by system 230 described above, it should be appreciated that method 300 may be utilized by a variety of other harvesters or as part of other agricultural machines or other harvester head reel positioning systems.

Method 300 is similar to method 100 except that method 300 utilizes signals from at least one sensor to automatically initiate the rephasing set forth in blocks 104, 106 108 (described above). As indicated by block 304, the stroke position of a piston 72 and/or rod 74 is sensed by at least one sensor, such as sensor 280 described above.

As indicated by block 306, controller 60 utilizes such signals to determine the position of piston 72 and/or rod 74. Controller 60 compares the determined position with respect to the predetermined end of stroke location for the piston 72 and/or rod 74. An end of stroke position may be the position at which rod 74 is fully received a retracted into barrel 70 (position 77) or the position in which rod 74 is fully extended from barrel 70 (position 77'). Controller 60 determines whether the determined position of piston 72 and/or rod 74 is within a predetermined range of the end of stroke position. In another implementation, controller 60 compares an anticipated future position of piston 72 and/or rod 74 given a current positioning command that is being executed to the predetermined end of stroke position. As indicated by arrow 308, the sensing of the stroke position and the determination of whether the stroke position is within a predetermined range of the end of stroke position is repeatedly carried out until the sensed position falls within a predetermined range of the end of stroke. In response to the sensed position of piston 72 and/or rod 74 being within a predetermined range of the end of stroke position, the rephasing actions described above with respect to blocks 104, 106 and 108 are carried out.

Figure 5:
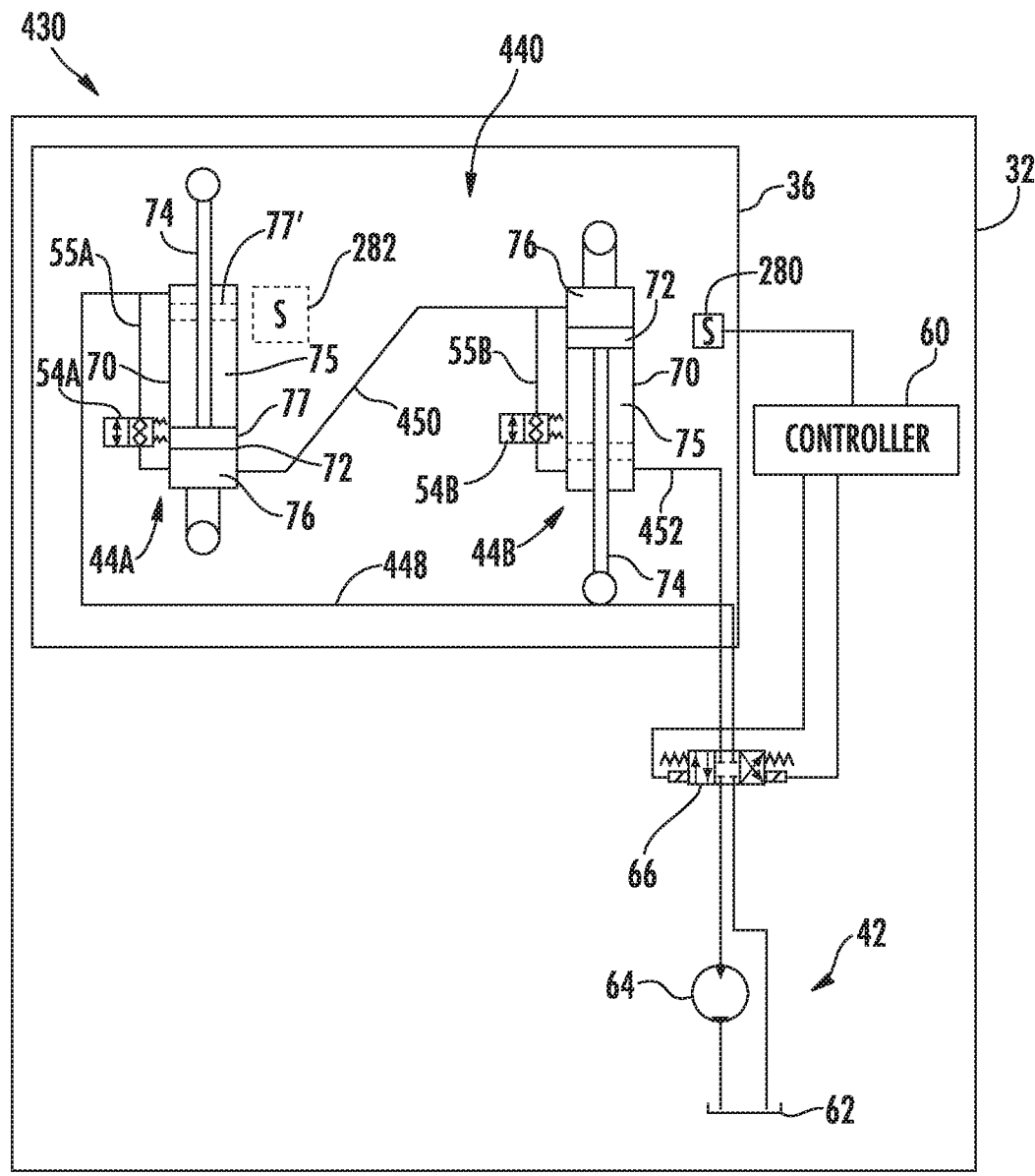
FIG. 5 is a schematic diagram of portions of an example reel positioning system of an example harvester head.

FIG. 5 schematically illustrates portions of another example harvester head 430. Harvester head 430 is similar to harvester head 230 described above except that harvester head 430 comprises reel positioning system 440 in lieu of reel positioning system 240. Reel positioning system 440 is similar to reel positioning system 240 except that system 440 comprises hydraulic fluid line 450 in place of hydraulic fluid line 50 and that rods 74 of cylinders 44 are each connected to different portions of reel 36 such that opposite motions of rods 74 of cylinders 44 move reel 36 in the same direction. For example, extension of rod 74 of cylinder 44A moves a first portion of reel 36 upwardly while retraction of rod 74 reel 44B moves a second portion of reel 36 upwardly. In another implementation, retraction of rod 74 of cylinder 44A moves a first portion of reel 36 upwardly while extension of rod 74 of reel 44B moves a second portion of reel 36 upwardly. In yet another implementation, extension of rod 74 of cylinder 44A moves a first portion of reel 36 forwardly while retraction of rod 74 of cylinder 44B moves a second portion of reel 36 forwardly. In another implementation, retraction of rod 74 of reel 44A moves a first portion of reel 36 forwardly while extension of rod 74 of reel 44B moves a second portion of reel 36 forwardly. Although each of such examples described as moving the reel either upwardly or forwardly, it should be appreciated that switching from a state of extension to a state of retraction and vice versa results in reel 36 being moved and an opposite direction, downwardly or rearwardly in the respective examples.

Unlike hydraulic fluid line 50 which fluidly connects a rod side 75 of cylinder 44A to a cap side 76 of cylinder 44B, hydraulic fluid line 450 connects cap side 76 of hydraulic cylinder 44A to cap side 76 of hydraulic cylinder 44B. as a result, repositioning errors due to the volumetric differences between rod side 75 and cap side 76 are minimized or eliminated. This may facilitate enhanced control of the rephasing of cylinders 44.

During normal operation (not a time of rephasing), rephasing valves 54 are maintained in a closed or blocking state. To reposition reel 36 in a first direction (upward/downward or forward/rearward), controller 60 actuate valve 66 and pump 64 such that hydraulic fluid is pumped through hydraulic fluid line 448 into rod side 75 of piston 72 in cylinder 44A. This results in rod 74 of cylinder 44A being retracted. This also results in fluid on cap side 76 flowing through hydraulic fluid line 450 to cap side 76 of piston 72 of cylinder 44B. This results in rod 74 being extended. Because the volume of both cap sides 76 are the same or approximate the same, rod 74 of cylinders 44A and 44B retract and extend by substantially the same extent, respectively, to reposition reel 36 in the first direction.

Likewise, to reposition reel in a second direction, opposite to the first direction, controller 60 actuates valve 66 and pump 64 such that hydraulic fluid is pumped through hydraulic fluid line 452 into rod side 75 of piston 72 in cylinder 44B. This results in rod 74 of cylinder 44B being retracted. This also results in fluid on cap side 76 flowing through hydraulic fluid line 450 to cap side 76 of piston 72 of cylinder 44A. This results in rod 74 being retracted. Because the volume of both cap sides 76 are the same or approximate the same, rod 74 of cylinders 44A and 44B extend and retract by substantially the same extent, respectively, to reposition reel 36 in the second direction.

As described above, over time, the positioning of piston 72 and cylinders 44 may become offset from one another such that when rod 74 of cylinder 44A is fully extended, rod 74 of cylinder 44B is not fully retracted, and vice versa. This may result in reel 36 becoming canted or tilted in the vertical and/or horizontal direction. To address such an occurrence, controller 60 is configured to carry out rephasing of piston 72 of cylinders 44. Controller 60 is configured to output control signals that actuate each of rephasing valves 54 to the open or pass-through state. Rephasing valves 54 may be actuated to the open or pass-through state at the initiation of rephasing or in response to a sensed end of stroke position being attained by one of cylinders 44. Controller 60 further outputs control signals to valve 66 and pump 64 so as to pump hydraulic fluid through hydraulic fluid line 448 to side 75 of hydraulic cylinder 44A. Due to the larger volume of the interior of side 75 of barrel 70 of cylinder 44A and the natural fluid resistance in the hydraulic lines of rephasing valve 54A, the pressure of the hydraulic fluid being pumped into side 75 of cylinders 44A initially moves piston 72 of cylinder 44A to its end of stroke position 77. Once the end of stroke position 77 is attained by piston 72 of cylinder 44A, the pump hydraulic fluid is diverted across and through rephasing valve 54A through hydraulic line 450 to side 76 of hydraulic cylinder 44B, ensuring that piston 72 of cylinder 44B is also displaced to its end of stroke position 77'. Once piston 72 of cylinder 44B has attained its end of stroke position 77', the pump hydraulic fluid begins to pass through rephasing valve 54B or passes through valve 54B at a greater rate into hydraulic line 452 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

Alternatively, to rephase pistons 72 at their other end of stroke positions, controller 60 is configured to output control signals that actuate each of rephasing valves 54 to the open or pass-through state. Controller 60 further outputs control signals to valve 66 and pump 64 so as to pump hydraulic fluid through hydraulic fluid line 452 to side 75 of hydraulic cylinder 44B. Due to the larger volume of the interior of side 75 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77. Once the end of stroke position 77 is attained by piston 72 of cylinder 44B, the pump hydraulic fluid is diverted across and through rephasing valve 54B through hydraulic line 450 to side 76 of hydraulic cylinder 44A, ensuring that piston 72 of cylinder 44B is also displaced to its end of stroke position 77'. Once piston 72 of cylinder 44A has attained its end of stroke position 77', the pump hydraulic fluid begins to pass through rephasing valve 54A or passes through valve 54A at a greater rate into hydraulic line 448 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

As described above, the initiation of rephasing in system 440 may be triggered in a variety of different manners. In one implementation, a person or operator may input a command or selection to controller 60 triggering such rephasing. In another implementation, such rephasing may be automatically triggered based upon the sensed positioning of piston 72 and/or rod 74 relative to an end of stroke position for the piston 72 and/or rod 74, such as with sensor 280. In another implementation, such rephasing may be automatically triggered based upon a sensed position and/or orientation of reel 36, such as with sensors 280, 282, wherein sensor 282, 282 sense positioning of different portions of reel 36. In another implementation, such rephasing may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such rephasing may be automatically triggered based upon the receipt of a command instructing the repositioning of piston 72 and/or rod 74 to within a predetermined range of an end of stroke position 77, 77'.

Figure 6:
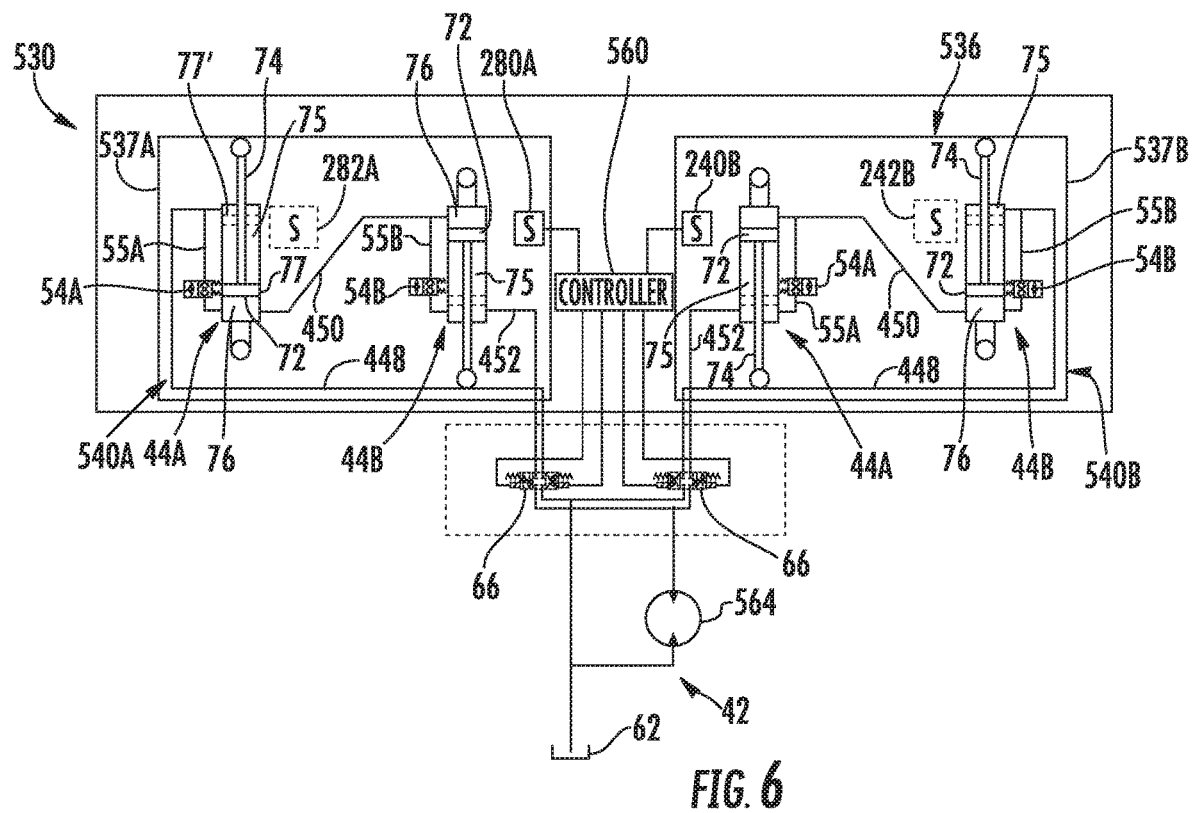
FIG. 6 is a schematic diagram of portions of example reel positioning systems of an example multi-segment reel of a harvester head.

FIG. 6 schematically illustrates portions of another example harvester head 530. Harvester head 530 comprises reel 536, positioning systems 540A, 540B (collectively referred to as positioning systems 540), sensors 280A, 280B (collectively referred to as sensors 580), and controller 560. Reel 536 is formed by at least two segments 537A, 537B (collectively referred to as segments 537). Although two of such segments as shown, it should be appreciated that reel 536 may be formed by multiple sets of side-by-side segments similar to the example side-by-side segments 537A, 537B. For example, reel 536 may comprise three of such segments, wherein the middle segment forms part of two pairs of side-by-side segments. In another implementation, reel 536 may comprise greater than three of such segments forming two or more pairs of side-by-side segments.

Positioning systems 540A, 540B selectively and controllably reposition segments 537A and 537B, respectively. Each of positioning systems 540 is similar to positioning system 440 described above except that positioning systems 540 share fluid reservoir 62 and a bidirectional pump 564. Positioning system 540 are both controlled by controller 560 which, as will be described hereafter, facilitate synchronization of positioning systems 540.

Similar to positioning system 440, in addition to the shared controller 560, reservoir 62 and bidirectional pump 564, each of positioning systems 540 comprises hydraulic cylinders hydraulic cylinders 44A, 44B (collectively referred to as hydraulic cylinders 44), hydraulic line 448, hydraulic line 450, hydraulic line 452 and rephasing valves 54A, 54B (collectively referred to as rephasing valve 54), each of which is described above respect to system 440. As with head 430, hydraulic cylinders 44 of head 530 are each coupled to different portions of a respective one of segments 537 so as to reposition such different portions of the respective segment 537. Hydraulic cylinders 44 cooperate with one another to reposition the respective segment 537. In one implementation, hydraulic cylinders 44 reposition the respective segment 537 by raising or lowering respective segment. In another implementation, hydraulic cylinders 44 reposition the respective segment by moving the respective segment in a forward or rearward direction.

Controller 560 comprises a processing unit or other electronic circuitry that controls the operation of each of positioning systems 540. Controller 560 may be in the form of a processing unit that follows instructions contained in a non-transitory computer-readable medium to control the operation of positioning systems 540. Controller 560 may be in the form of electronic circuitry or logic elements, such as an application-specific integrated circuit, that controls the operation of positioning systems 540. Controller 560 may comprise a combination of both a processing unit that follows instructions and circuitry or logic elements. Controller 560 may be contained in a single unit or may be distributed across multiple controller elements. In one implementation controller 560 is supported by frame 32 of head 530. In another implementation, controller 560 is remotely supported relative to frame 32.

During normal operation (not a time of rephasing), rephasing valves 54 are maintained in a closed or blocking state. To reposition each segment 537 in a first direction (upward/downward or forward/rearward), controller 560 actuates valves 66 and pump 564 such that hydraulic fluid is pumped through hydraulic fluid lines 448 into rod side 75 of piston 72 in cylinder 44A of each of segments 537. This results in rods 74 of cylinders 44A being retracted. This also results in fluid on cap sides 76 flowing through hydraulic fluid line 450 to cap side 76 of piston 72 of cylinders 44B. This results in rods 74 being extended. Because the volume of both cap sides 76 are the same or approximate the same, rod 74 of cylinders 44A and 44B retracted and extend by substantially the same extent, respectively, to reposition segments 537 in the first direction.

Likewise, to reposition segments 537 in a second direction, opposite to the first direction, controller 560 actuates valves 66 and pump 564 such that hydraulic fluid is pumped through hydraulic fluid lines 452 into rod side 75 of piston 72 in cylinders 44B. This results in rod 74 of cylinders 44B being retracted. This also results in fluid on cap side 76 flowing through hydraulic fluid line 450 to cap side 76 of pistons 72 of cylinders 44A. This results in rods 74 being retracted. Because the volume of both cap sides 76 are the same or approximate the same, rods 74 of cylinders 44A and 44B extend and retract by substantially the same extent, respectively, to reposition segments 537 in the second direction.

As described above, over time, the positioning of pistons 72 and cylinders 44 may become offset from one another such that when rod 74 of each of cylinders 44A is fully extended, rod 74 of each of cylinders 44B is not fully retracted, and vice versa. This may result in the individual segments 537 becoming canted or tilted in the vertical and/or horizontal direction. To address such an occurrence, controller 560 is configured to carry out rephasing of piston 72 of cylinders 44. Controller 560 is configured to individually and independently carry out rephasing with respect to each of segments 537. Such rephasing of the cylinders 44 associated with segments 537 may be carried out independent of one another with only one of the pair of segments 537 having its hydraulic cylinders being rephased, may be carried out sequentially or may be carried out concurrently.

The following describes rephasing of cylinders with respect to segment 537A. It should be appreciated that such rephasing may be likewise carried out with respect to cylinders of segment 537B. During such rephasing, controller 560 outputs control signals that actuate each of rephasing valves 54 to the open or pass-through state. Controller 560 further outputs control signals to valve 566 and pump 64 so as to pump hydraulic fluid through hydraulic fluid lines 448 to side 75 of hydraulic cylinder 44A. Due to the larger volume of the interior of side 75 of barrel 70 cylinder 44A and the natural fluid resistance in the hydraulic line of rephasing valve 54A, the pressure of the hydraulic fluid being pumped into side 75 of cylinder 44A initially moves piston 72 of cylinder 44A to its end of stroke position 77. Once the end of stroke position 77 is attained by piston 72 of each of cylinder 44A, the pump hydraulic fluid is diverted across and through rephasing valve 54A through hydraulic line 450 to side 76 of hydraulic cylinder 44B, ensuring that piston 72 of cylinder 44B is also displaced to its end of stroke position 77'. Once piston 72 of cylinder 44B has attained its end of stroke position 77', the pump hydraulic fluid begins to pass through rephasing valve 54B or passes through valve 54B at a greater rate into hydraulic line 452 and back to reservoir 62 of fluid supply 42. Following a predetermined period of time or in response to signals indicating that pistons 72 are once again in phase with one another, controller 560 is configured to output control signals actuating rephasing valves 54 back to their fluid blocking or closed states.

Alternatively, to rephase pistons 72 at their other end of stroke positions, controller 560 is configured to output control signals that actuate each of rephasing valves 54 to the open or pass-through state. Controller 560 further outputs control signals to valve 66 and pump 564 so as to pump hydraulic fluid through hydraulic fluid line 452 to side 75 of hydraulic cylinder 44B. Due to the larger volume of the interior of side 75 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77. Once the end of stroke position 77 is attained by piston 72 of cylinder 44B, the pump hydraulic fluid is diverted across and through rephasing valve 54B through hydraulic line 450 to side 76 of hydraulic cylinder 44A, ensuring that piston 72 of cylinder 44B is also displaced to its end of stroke position 77'. Once piston 72 of cylinder 44A has attained its end of stroke position 77', the pump hydraulic fluid begins to pass through rephasing valve 54A or passes through valve 54A at a greater rate into hydraulic line 448 and back to reservoir 62 of fluid supply 42. Following a predetermined period of time or in response to signals indicating that pistons 72 are once again in phase with one another, controller 560 is configured to output control signals actuating rephasing valves 54 back to their fluid blocking or closed states.

The initiation of rephasing in the individual positioning systems 540A, 540B may be triggered in a variety of different manners. In one implementation, a person or operator may input a command or selection to controller 60 triggering such rephasing for a selected one of system 540 or both of systems 540. In another implementation, such rephasing may be automatically triggered for a particular system 540*a*, 540B based upon the sensed positioning of piston 72 and/or rod 74 relative to an end of stroke position for the piston 72 and/or rod 74, such as with sensor 280A and/or 280B, each of which is similar to sensor 280 described above respect to system 440. In another implementation, such rephasing may be automatically triggered based upon a sensed position and/or orientation of the particular segment 537, such as with sensors 280, 282, wherein sensors 282, 282 sense positioning of different portions of the particular segment 537A, 537B. In another implementation, such rephasing may be triggered based upon a sensed relative positioning of piston 72 and/or rod 74 of different cylinders 44, based upon signals from sensors 280, 282, wherein sensors 280, 282 sense different positions of piston 72 and/or rod 74. In still another implementation, such rephasing may be automatically triggered based upon the receipt of an operator generated or a controller generated command instructing the repositioning of piston 72 and/or rod 74 to within a predetermined range of an end of stroke position 77, 77'.

In some circumstances, the two side-by-side segments 537 may themselves become offset relative to one another in a first direction (vertical direction or a fore-aft direction). Controller 560 is configured to further synchronize the positioning of segments 537 with respect to one another. To synchronize the positioning of segments 537 with respect to one another, controller 560 outputs control signals to valves 66 as well as rephasing valve 54 of each of systems 540 so as to reposition segments 537 at the same relative positions. In one implementation, controller 560 outputs control signals such that pistons 72 of cylinders 44 of both positioning systems 540 are actuated to the respective end of stroke positions such that both of segments 537 are fully raised, fully lowered, fully forward or fully rearward. In other words, positioning systems 540 are both rephased to an end of stroke state. In another implementation where the positioning of each of segments 537 is sensed by an associated sensor or where the positioning of each of pistons 72/rod 74 is sensed by an associated sensor (such as sensors 280, 282), controller 550 outputs control signals repositioning segments 537 such that segments 537 or piston 72/rod 74 are at the same relative positions (as determined from signals from the sensors) while piston 72 of cylinders 44 of each of systems 540 are at locations between their end of stroke positions.

The initiation of synchronization may be triggered in a variety of different manners. In one implementation, a person or operator may input a command or selection to controller 60 triggering such synchronization. In another implementation, such synchronization may be automatically triggered based upon the sensed positioning of piston 72 and/or rod 74 relative to an end of stroke position for the piston 72 and/or rod 74, such as with sensor 280A and/or 280B. For example, in response to receiving signals from sensor 280A and/or sensor 280B indicating an end of stroke position for a piston 72 or a near end of stroke position for piston 72, wherein when piston 72 is within a predetermined range of an end of stroke position, controller 560 may automatically carry out synchronization. In one implementation, controller 56 may automatically carry out rephasing with respect to both of systems 540 so as also synchronize systems 540.

In another implementation, such synchronization may be automatically triggered based upon a sensed relative positions and/or orientations of segments 537, wherein sensors 280 are configured to sense the positioning of their respective segments 537A, 537B. In another implementation, such synchronization may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such synchronization may be automatically triggered based upon the receipt of an operator generated or a controller generated command instructing the repositioning of piston 72 and/or rod 74 of at least one of systems 540 to within a predetermined range of an end of stroke position 77, 77'.

Figure 7:
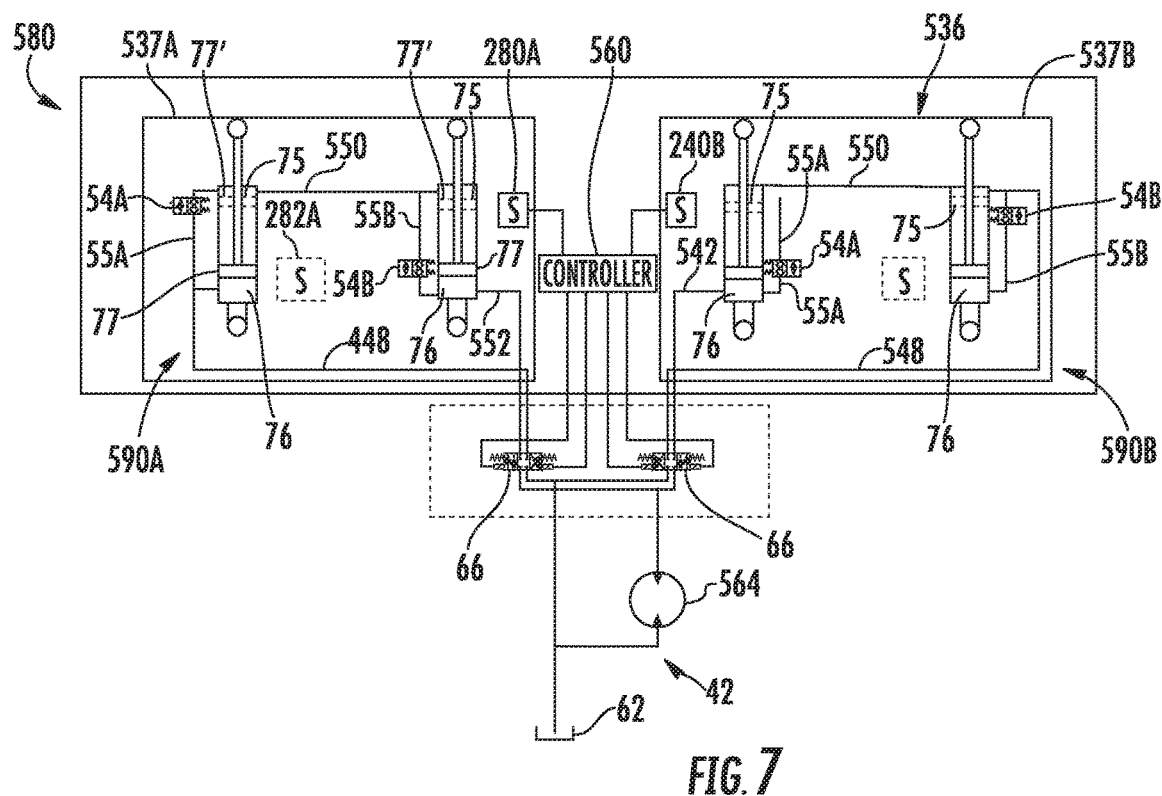
FIG. 7 is a schematic diagram of portions of other example reel positioning systems of an example multi-segment reel of a harvester head.

FIG. 7 schematically illustrates portions of another example harvester head 580. Harvest head 580 is similar to harvester head 530 described above except that harvester head 580 comprises positioning systems 590A and 590B in lieu of positioning systems 540A and 540B. The remaining components of harvest head 580 which correspond to components of harvester head 530 are numbered similarly.

Similar to reel positioning systems 540, reel positioning systems 590 are each connected to different portions of the associated reel segment 537 such that opposite motions of rods 74 of cylinders 44 move the associated reel segment 537 in the same direction. For example, extension of rod 74 of cylinder 44A moves a first portion of an associated reel segment 537 upwardly while retraction of rod 74 of cylinder 44B moves a second portion of the associated reel segment 537 upwardly. In another implementation, retraction of rod 74 of cylinder 44A moves a first portion of the associated reel segment 537 upwardly while extension of rod 74 of cylinder 44B moves a second portion the associated reel segment 537 upwardly. In yet another implementation, extension of rod 74 of cylinder 44A moves a first portion of the associated reel segment 537 forwardly while retraction of rod 74 of cylinder 44B moves a second portion of the associated reel segment 537 forwardly. In another implementation, retraction of rod 74 of reel 44A moves a first portion of the associated reel segment 537 forwardly while extension of rod 74 of cylinder 44B moves a second portion of the associated reel segment forwardly. Although each of such examples described as moving the reel either upwardly or forwardly, it should be appreciated that switching from a state of extension to a state of retraction and vice versa results in real segment 537 being moved in an opposite direction, downwardly or rearwardly in the respective examples.

Reel positioning systems 590 are each dissimilar to reel positioning systems 540 in that reel positioning systems 590 each comprise a hydraulic fluid line 550 that connects rod side 75 of hydraulic cylinder 44A to rod side 75 of hydraulic cylinder 44B. As a result, positioning errors due to the volumetric differences between rod side 75 and cap side 76 are minimized or eliminated. This may facilitate enhanced control of the rephasing of cylinders 44. Positioning systems 590 further comprise hydraulic lines 542 and 548 in lieu of hydraulic lines 448 and 452, respectively.

During normal operation (not a time of rephasing), rephasing valves 54 are maintained in a closed or blocking state. To reposition segments 537 in a first direction (upward/downward or forward/rearward), controller 560 actuates valves 66 and pump 564 such that hydraulic fluid is pumped through hydraulic fluid lines 448 into cap side 76 of piston 72 in cylinder 44A. This results in rod 74 of cylinder 44A being extended. This also results in fluid on rod side 75 flowing through hydraulic fluid line 550 to rod side 75 of piston 72 of cylinder 44B. This results in rod 74 being retracted. Because the volume of both rod side 75 are the same or approximately the same, rods 74 of cylinders 44A and 44B extend and retract by substantially the same extent, respectively, to reposition segments 537 in the first direction.

Likewise, to reposition segments 537 in a second direction, opposite to the first direction, controller 560 actuates valves 66 and pump 564 such that hydraulic fluid is pumped through hydraulic fluid line 552 into cap side 75 of piston 72 in cylinder 44B. This results in rod 74 of cylinder 44B being extended. This also results in fluid on rod side 75 flowing through hydraulic fluid line 550 to rod side 75 of piston 72 of cylinder 44A. This results in rod 74 being extended. Because the volume of both rod side 75 are the same or approximately the same, rods 74 of cylinders 44A and 44B extend and retract by substantially the same extent, respectively, to reposition reel segments 537 in the second direction.

As described above, over time, the positioning of pistons 72 in cylinders 44 may become offset from one another such that when rod 74 of cylinder 44A is fully extended, rod 74 of cylinder 44B is not fully retracted, and vice versa. This may result in reel 36 becoming canted or tilted in the vertical and/or horizontal direction. To address such an occurrence, controller 560 is configured to carry out rephasing of piston 72 of cylinders 44. Controller 560 is configured to output control signals that actuate each of rephasing valves 54 to the open or pass-through state. Controller 560 further outputs control signals to valves 66 and pump 564 so as to pump hydraulic fluid through hydraulic fluid line 548 to side 76 of hydraulic cylinder 44A. Due to the larger volume of the interior of side 75 of barrel 70 of cylinder 44A and the natural fluid resistance in the hydraulic lines of rephasing valve 54A, the pressure of the hydraulic fluid being pumped into side 76 of cylinders 44A initially moves piston 72 of cylinder 44A to its end of stroke position 77'. Once the end of stroke position 77' is attained by piston 72 of cylinder 44A, the pump hydraulic fluid is diverted across and through rephasing valve 54A through hydraulic line 550 to side 75 of hydraulic cylinder 44B, ensuring that piston 72 of cylinder 44B is also displaced to its end of stroke position 77. Once piston 72 of cylinder 44B has attained its end of stroke position 77, the pump hydraulic fluid begins to pass through rephasing valve 54B or passes through valve 54B at a greater rate into hydraulic line 452 and back to reservoir 62 of fluid supply 542. Following a predetermined period of time or in response to signals indicating that pistons 72 are once again in phase with one another, controller 60 is configured to output control signals actuating rephasing valves 54 back to their fluid blocking or closed states.

Alternatively, to rephase piston 72 at their other end of stroke positions, controller 560 is configured to output control signals that actuate each of rephasing valves 54 to the open or pass-through state. Controller 60 further outputs control signals to valve 66 and pump 564 so as to pump hydraulic fluid through hydraulic fluid line 552 to side 76 of hydraulic cylinder 44B. Due to the larger volume of the interior of side 76 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77'. Once the end of stroke position 77' is attained by piston 72 of cylinder 44B, the pump hydraulic fluid is diverted across and through rephasing valve 54B through hydraulic line 550 to side 75 of hydraulic cylinder 44A, ensuring that piston 72 of cylinder 44B is also displaced to its end of stroke position 77. Once piston 72 of cylinder 44A has attained its end of stroke position 77, the pump hydraulic fluid begins to pass through rephasing valve 54A or passes through valve 54A at a greater rate into hydraulic line 548 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

As described above, the initiation of rephasing in systems 590 may be triggered in a variety of different manners. In one implementation, a person or operator may input a command or selection to controller 560 triggering such rephasing. In another implementation, such rephasing may be automatically triggered based upon the sensed positioning of piston 72 and/or rod 74 relative to an end of stroke position for the piston 72 and/or rod 74, such as with the associated sensor 280. In another implementation, such rephasing may be automatically triggered based upon a sensed position and/or orientation of the segment 537 of reel 536, such as with sensors 280, and/or 282, wherein sensor 282, 282 sense positioning of different portions of segment 537. In another implementation, such rephasing may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such rephasing may be automatically triggered based upon the receipt of a command instructing the repositioning of piston 72 and/or rod 74 to within a predetermined range of an end of stroke position 77, 77'.

As with positioning systems 540 of harvester head 530, positioning systems 590 associated with the different segments 537A and 537B share fluid reservoir 62 and a bidirectional pump 564. Positioning system 540 are both controlled by controller 560 which facilitates synchronization of positioning systems 590.

In some circumstances, the two side-by-side segments 537 may themselves become offset relative to one another in a first direction (vertical direction or a fore-aft direction). Controller 560 is configured to further synchronize the positioning of segments 537 with respect to one another. To synchronize the positioning of segments 537 with respect to one another, controller 560 outputs control signals to valves 66 as well as rephasing valve 54 of each of systems 590 so as to reposition segments 537 at the same relative positions. In one implementation, controller 560 outputs control signals such that pistons 72 of cylinders 44 of both positioning systems 590 are actuated to the respective end of stroke positions such that both of segments 537 are fully raised, fully lowered, fully forward or fully rearward. In other words, positioning systems 590 are both rephased to an end of stroke state. In another implementation where the positioning of each of segments 537 is sensed by an associated sensor or where the positioning of each of pistons 72/rod 74 is sensed by an associated sensor (such as sensors 280, 282), controller 560 outputs control signals repositioning segments 537 such that segments 537 or piston 72/rod 74 are at the same relative positions (as determined from signals from the sensors) while piston 72 of cylinders 44 of each of systems 540 are at locations between their end of stroke positions.

The initiation of synchronization may be triggered in a variety of different manners. In one implementation, a person or operator may input a command or selection to controller 560 triggering such synchronization. In another implementation, such synchronization may be automatically triggered based upon the sensed positioning of piston 72 and/or rod 74 relative to an end of stroke position for the piston 72 and/or rod 74, such as with sensor 280A and/or 280B. For example, in response to receiving signals from sensor 280A and/or sensor 280B indicating an end of stroke position for a piston 72 or a near end of stroke position for piston 72, wherein the system two is within a predetermined range of an end of stroke position, controller 560 may automatically carry out synchronization. In one implementation, controller 56 may automatically carry out rephasing with respect to both of systems 590 so as also synchronize systems 540.

In another implementation, such synchronization may be automatically triggered based upon a sensed relative positions and/or orientations of segments 537, wherein sensors 280 are configured to sense the positioning of their respective segments 537A, 537B. In another implementation, such synchronization may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such synchronization may be automatically triggered based upon the receipt of an operator generated or a controller generated command instructing the repositioning of piston 72 and/or rod 74 of at least one of systems 540 to within a predetermined range of an end of stroke position 77, 77'.

Figure 8:
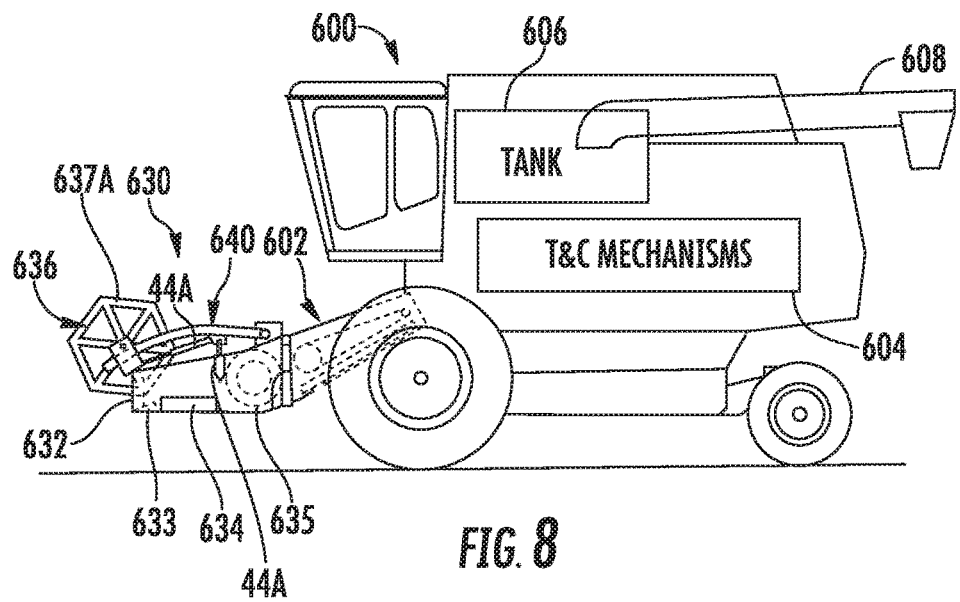
FIG. 8 is a side view of an example harvester.

FIG. 8 is a side view of an example harvester 600 comprising an example header 630. In addition to header 630, harvester 600 comprises feeder house 602, threshing and cleaning mechanisms 604, storage tanks 606 and unloader 608. Header 630 separates the crop or plant from a growing medium and direct such separated are severed crops to feeder house 602. Feeder house 602 transfers the crop to threshing and cleaning mechanisms 604. Threshing and cleaning mechanisms 604 (schematically shown) separate the grain or other crop portion from remaining portions of the severed crop. In one implementation, threshing and cleaning mechanisms 604 comprise mechanisms such as, threshing rotors, concaves, straw walkers, chaffers, sieves and the like, wherein the separated and cleaned grain is conveyed to storage tanks 606 and wherein the remaining portions of the crop, such as material other than grain, are discharged from a rear of harvester 600. The grain or other crop may then later be discharged from tanks 606 by unloader 608.

As indicated above, header 630 separates the crop or plant from a growing medium and directs the crop to feeder house 602. In one implementation, header 630 is removably mounted to feeder house 602. In another implementation, header 630 is fixed to feeder house 602. As shown by FIG. 8, header 630 comprises frame 632, cutter bar 633, draper belt 634, feed drum 635, reel 636 and positioning systems 640. Frame 632 supports remaining opponents of header 630 and forms a platform for the collection of the crop being draper belt 634. Directed to feeder house 602. Cutter bar 633 severs the crop from the growing medium. In one implementation, cutter bar 63 comprises a reciprocating series of knives. Draper belt 634 comprises one or more belts that are driven to carry the crop to a central location adjacent feeder drum 635. Feeder drum 635 feeds the crop into feeder house 602.

Figure 9:
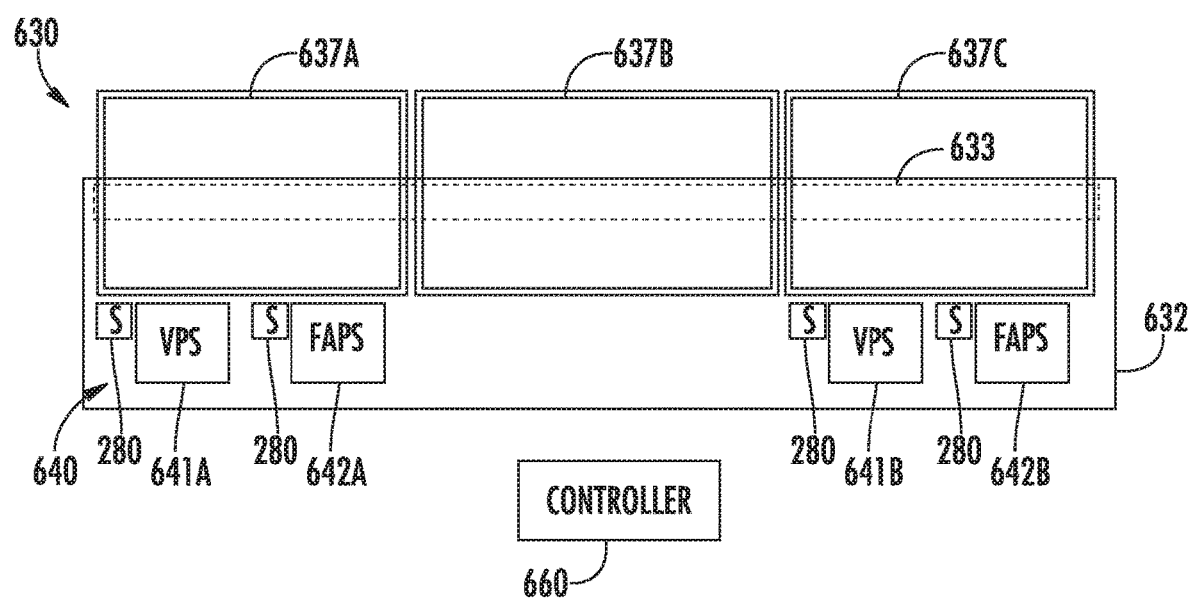
FIG. 9 is a top view schematically illustrating portions of a multi-segment reel of an example harvester head of the harvester of FIG. 8.

FIG. 9 is a top view schematically illustrating reel 636 and positioning system 640. In the example illustrated, reel 636 is formed from three segments 637A, 637B and 637C (collectively referred to as segments 637. Segments 637 are rotatably supported above and forwardly beyond cutter bar 633. Segments 637 are rotatably driven to gather and direct crop towards cutter bar 633 and onto draper belt 634 (shown in FIG. 7). In the example illustrated, each of segments 637 comprises a spindle supporting a series of circumferentially spaced bats that gather and direct the crop towards cutter bar 633 and draper belt 634. Segments 637 are each movable relative to one another in both vertical directions and fore-aft directions.

Positioning system 640 position segments 637 in the vertical directions and fore-aft directions. Positioning systems 640 comprise vertical positioning systems (VPS) 641A, 641B (collectively referred to as systems 641) and fore-aft positioning systems (FAPS) 642A, 642B (collectively referred to as systems 642). As described below, segments 637B shares the vertical and fore-aft positioning systems of segments 637A and 637C. In the example illustrated, the right side of segments 637A and the left side of segments 637B are concurrently raised and lowered by the right side hydraulic cylinder of vertical positioning system 641A. The right side of segments 637A and the left side of segments 637B are concurrently moved forwardly or rearwardly by the right side hydraulic cylinder of fore-aft positioning system 642A. The rephasing of the vertical positioning system 641A and 641B may be synchronized by controller 660 to maintain the vertical positioning of segment 637B in alignment with that of segments 637A and 637C.

Likewise, in the example illustrated, the left side of segment 637C and the right side of segments 637B are concurrently raised and lowered by the left side hydraulic cylinder of vertical positioning system 641B. The left side of segment 637C and the right side of segment 637B are concurrently moved forwardly or rearwardly by the left side hydraulic cylinder of fore-aft positioning system 642B. The rephasing of the fore-aft positioning system 642A and 642B may be synchronized by controller 660 to maintain the forward or rearward positioning of segment 637B in alignment with that of segments 637A and 637C.

Systems 641A and 641C move or adjust a vertical positioning of their respective segments 637C and 637B, which results in vertical adjustment of the opposite ends of segment 637B. Systems 642A and 642B move or adjust a fore-aft (frontward-rearward) positioning of the respective segments 637C and 6376, which results in fore-aft adjustment of the opposite ends of segments 637B. Each of positioning systems 641 is similar to positioning system 590A described above. Each of positioning systems 642 is similar to positioning system 540A described above. Controller 660 controls the rephasing of each positioning system 641, 642 as described above.

Controller 660 further synchronizes each of positioning systems 641 with respect to one another and each of systems 642 with respect to one another. Controller 660 synchronizes the positioning of the side-by-side segments 637A and 637C as described above with respect to the synchronization of the positioning of the side-by-side segments 537A and 537B. such synchronization results in the middle segment 637B also being maintained in vertical and fore-aft alignment with segments 637A and 637C. As a result, unless otherwise instructed, such as to accommodate terrain variations, controller 660 maintains segments 637 at the same vertical positions and at the same fore-aft positions.

Figure 10:
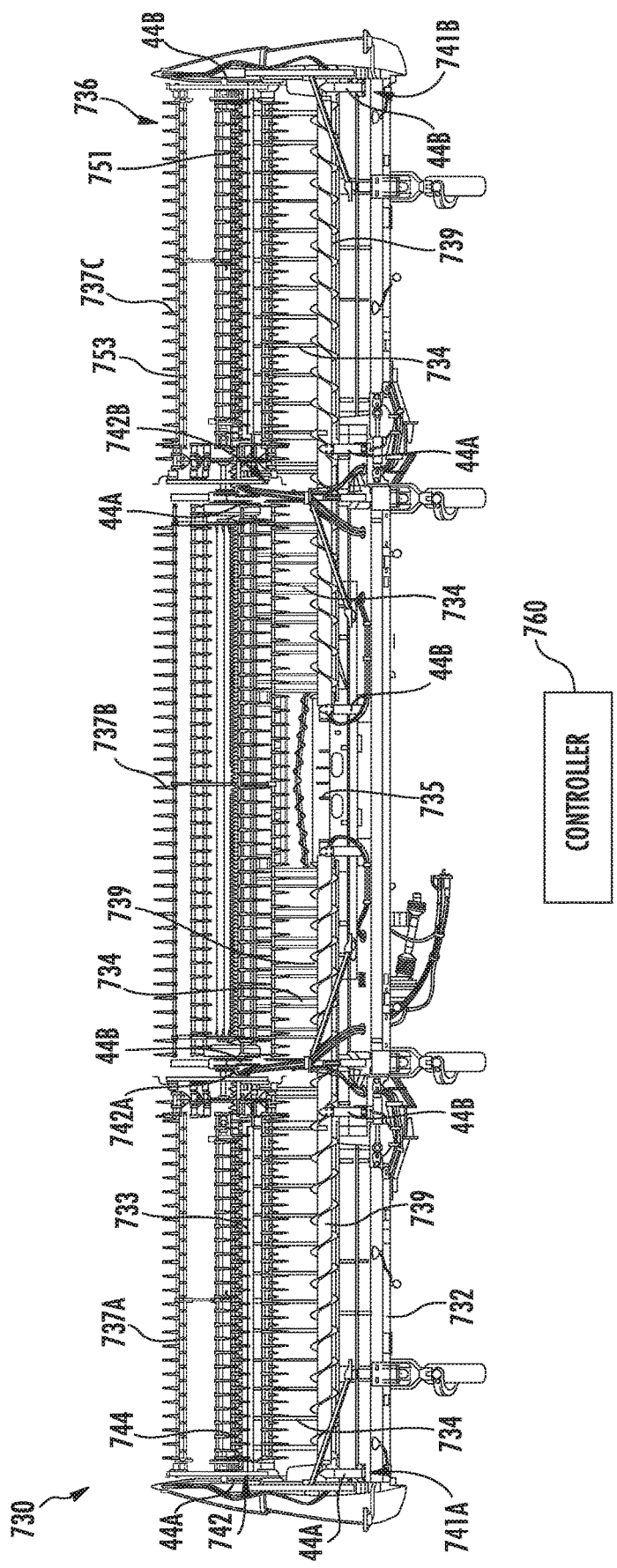
FIG. 10 is a top view of an example multi-segment reel of an example harvester head for the example harvester of FIG. 8.
Figure 11:
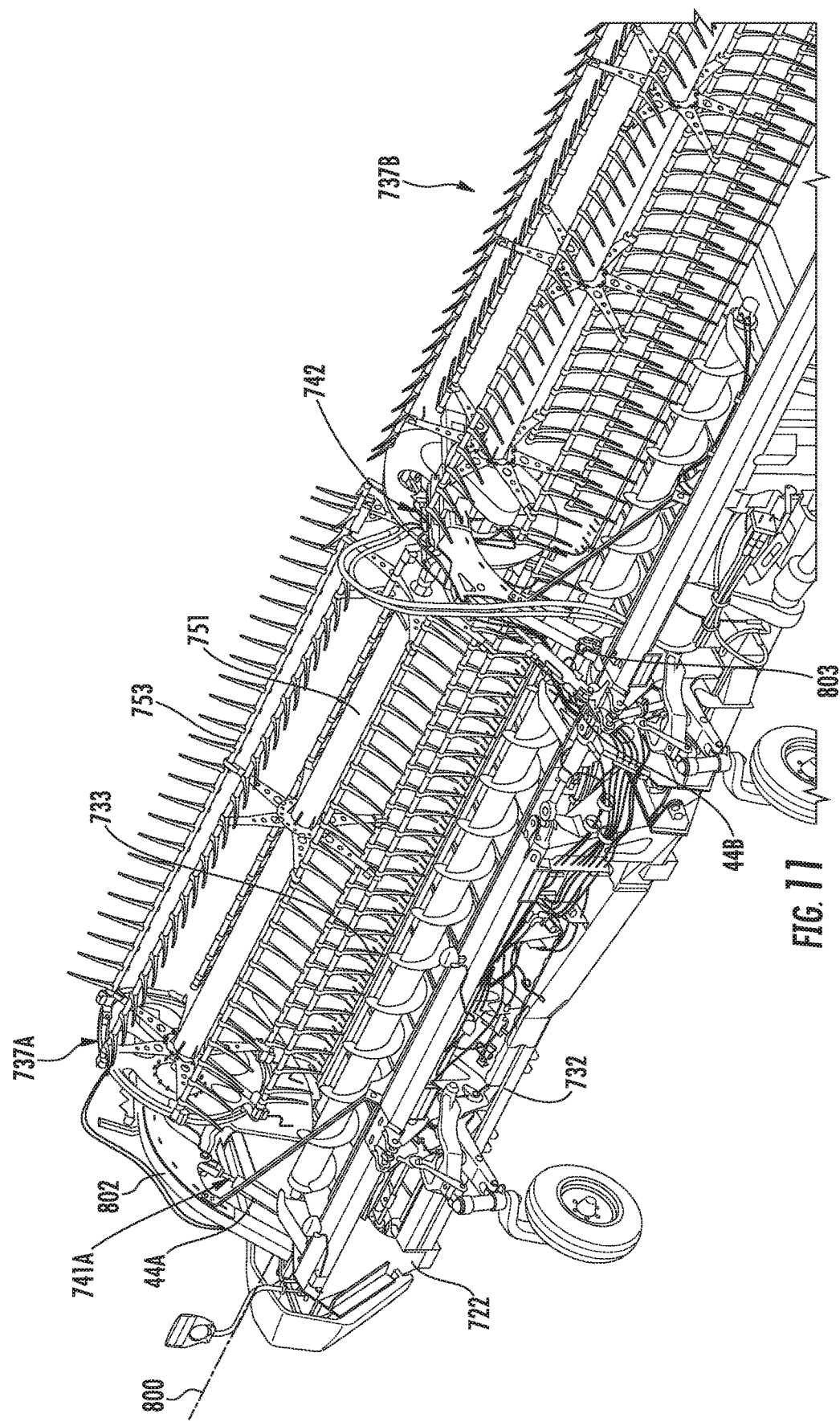
FIG. 11 is an enlarged fragmentary perspective view of a portion of the harvester head of FIG. 10.
Figure 12:
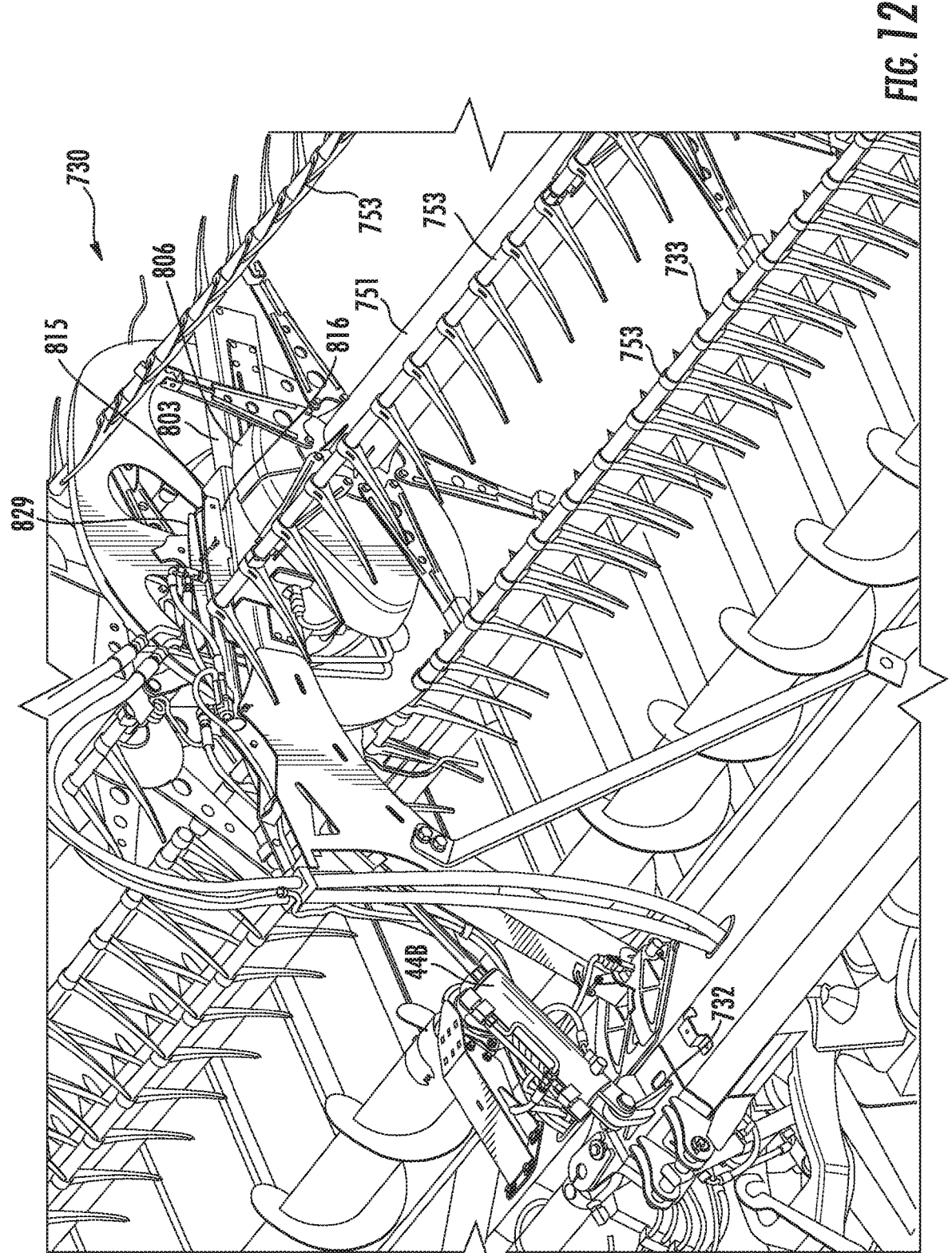
FIG. 12 is an enlarged fragmentary perspective view of a portion of the harvester head of FIG. 10.

FIGS. 10-15 illustrate harvester header 730, an example implementation of harvester header 630 for use with harvester 600. As shown by FIG. 10, header 730 comprises frame 732, cutter bar 733, draper belts 734, and feed drum 735 which correspond in function to frame 632, cutter bar 633, draper belt 634 and feed drum 635, respectively, as described above. Header 730 additionally comprises augers 739 which assist in conveying crop laterally to feed drum 735. Header 730 additionally comprises positioning systems 641, 642 (described above).

Similar to header 630, header 730 comprises a reel 736 formed by three reel segments 737A, 737B and 737C (collectively referred to as segments 737). Segments 737 are rotatably supported above and forwardly beyond cutter bar 733. Segments 737 are rotatably driven to gather and direct crop towards cutter bar 733 and onto draper belt 734. In the example illustrated, each of segments 737 comprises a spindle 751 supporting a series of circumferentially spaced bats 753 that gather and direct the crop towards cutter bar 733 and draper belt 734. Segments 737 are each movable relative to one another in both vertical directions and fore-aft directions. As with header 630, segment 737B shares the vertical and fore-aft positioning systems of segments 737A and 737C. In the example illustrated, the right side of segment 737A and the left side of segment 737B are concurrently raised and lowered by the right side hydraulic cylinder of vertical positioning system 741A. The right side of segment 737A and the left side of segment 737B are concurrently moved forwardly or rearwardly by the right side hydraulic cylinder of fore-aft positioning system 742A. The rephasing of the vertical positioning system 741A and 741B may be synchronized by controller 760 to maintain the vertical positioning of segment 737B in alignment with that of segments 737A and 737C.

Likewise, In the example illustrated, the left side of segment 737C and the right side of segments 737B are concurrently raised and lowered by the left side hydraulic cylinder of vertical positioning system 741B. The left side of segments 737C and the right side of segment 737B are concurrently moved forwardly or rearwardly by the left side hydraulic cylinder of fore-aft positioning system 742B. The rephasing of the fore-aft positioning system 742A and 742B may be synchronized by controller 760 to maintain the forward or rearward positioning of segment 737B in alignment with that of segments 737A and 737C.

Systems 741A and 741B move or adjust a vertical positioning of their respective segments 737A and 737B, which results in vertical adjustment of the opposite ends of segments 737B. System 742A and 742B move or adjust a fore-aft (frontward-rearward) positioning of the respective segments 737A and 737B, which results in fore-aft adjustment of the opposite ends of segments 737B. Each of positioning systems 741 is similar to positioning system 590A described above. Each of positioning systems 742 is similar to positioning system 540A described above. Controller 760 controls the rephasing of each positioning system 741, 742 as described above.

Controller 760 further synchronizes each of positioning systems 741 with respect to one another and each of systems 742 with respect to one another. Controller 760 synchronizes the positioning of the side-by-side segments 737A and 737C as described above with respect to the synchronization of the positioning of the side-by-side segments 537A and 537B. such synchronization results in the middle segment 737B also being maintained in vertical and fore-aft alignment with segments 737A and 737C. As a result, unless otherwise instructed, such as to accommodate terrain variations, controller 760 maintains segments 737 at the same vertical positions and at the same fore-aft positions.

FIGS. 10-15 illustrate positioning systems 741 positioning each of reel segments 737 in a fully lowered state. FIGS. 10-15 illustrate positioning system 742 positioning each of reel segments 737 in a fully rear or aft state. As described above with respect to positioning system 641, the hydraulic cylinders 44 are arranged such extension of one hydraulic cylinder and retraction of the other hydraulic cylinder move different portions of the same segment in the same direction.

Positioning system 741A secures ends of the two hydraulic cylinders 44A and 44B to frame 732 on opposite sides of the pivot axis 800 of reel segment 737A. In the example illustrated, reel segment 737A comprises an outer guide bar 802 and an inner guide bar 803 that are pivotally connected to frame 732 for pivotal movement about axis 800. Guide bars 802, 803 carry bearings and drive assemblies 806 (shown in FIG. 12) which rotatably support spindle 751 and the associated bats 753. Cylinder 44A is attached at one end to frame 732 forward of axis 800 and at the other end to outer guide bar 802. Cylinder 44B is attached at one end to frame 732 rearward of axis 800 and at the other end to inner guide bar 803. In the example illustrated, rod 74 of both of cylinders 44A and 44B of positioning system 741A are pivotably attached to guide bars 802, 803. As a result, extension of cylinder 44A and collapse or retraction of cylinder 44B raise reel segment 737A in the left side of segment 737B. Retraction of cylinder 44B and extension of cylinder 44A lower reel segment 737A in the left side of segment 737B.

Figure 13:
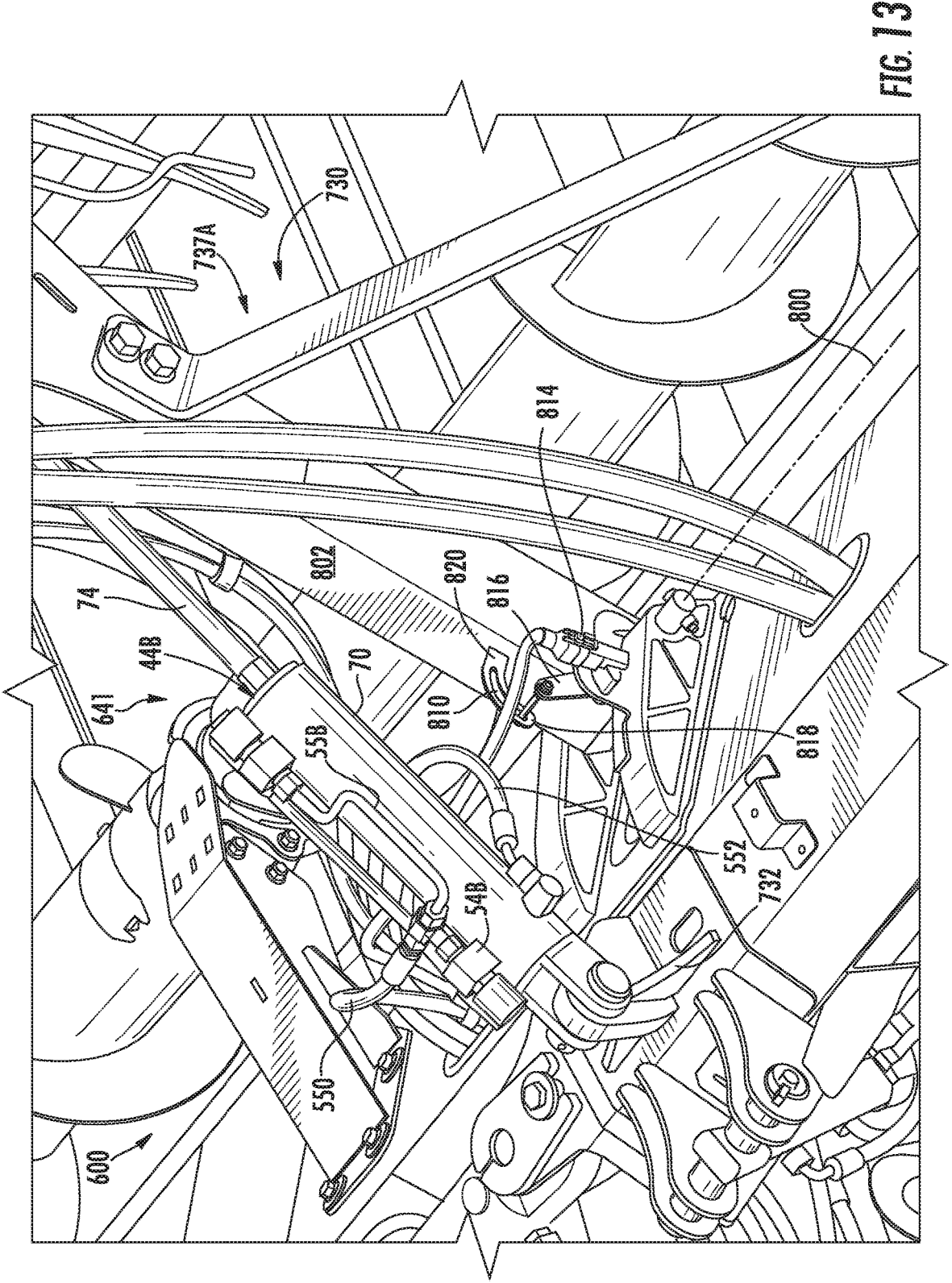
FIG. 13 is a large fragmentary perspective view of a portion of the harvester head of FIG. 10.

FIG. 13 illustrates sensor 280 of vertical positioning system 741 of segment 737A. As shown by FIG. 13, sensor 280 of positioning system 741 comprises slot 810 and rotational sensor 814. Slot 810 is carried by guide bar 802 and pivots about axis 800 with guide bar 802. Slot 810 extends in an arc having a radius centered about axis 800. Slot 810 has an arcuate length less than the arcuate travel of guide bar 802 about axis 800.

Rotational sensor 814 interacts with slot 810 to sense the angular positioning of guide bar 802 relative to axis 800. Rotational sensor 814 senses the rotation of an arm 816 received within slot 810. During pivoting of guide bar 802, slot 810 moves about axis 800. Prior to being rotated fully clockwise, to the extreme down position for reel segment 737A, the end 818 of slot 810 engages arm 816, causing arm 816 rotate in a clockwise direction. Likewise, prior to being rotated fully counterclockwise, to the extreme up position for reel segment 737A, the end 820 of slot 810 engages arm 816, causing arm 816 to rotate in a counterclockwise direction. Rotational sensor 814 senses a rotation of arm 816 so as to identify when guide bar 802 is approaching or at the fully up position or when guide bar 802 is approaching or at the fully down position, corresponding to the end of stroke positions of hydraulic cylinder 44B. In one implementation, rotational sensor 814 comprises a rotary Hall effect sensor that senses the rotation of arm 816. In other implementations, sensor 280 of positioning system 741 may have other configurations.

Figure 14:
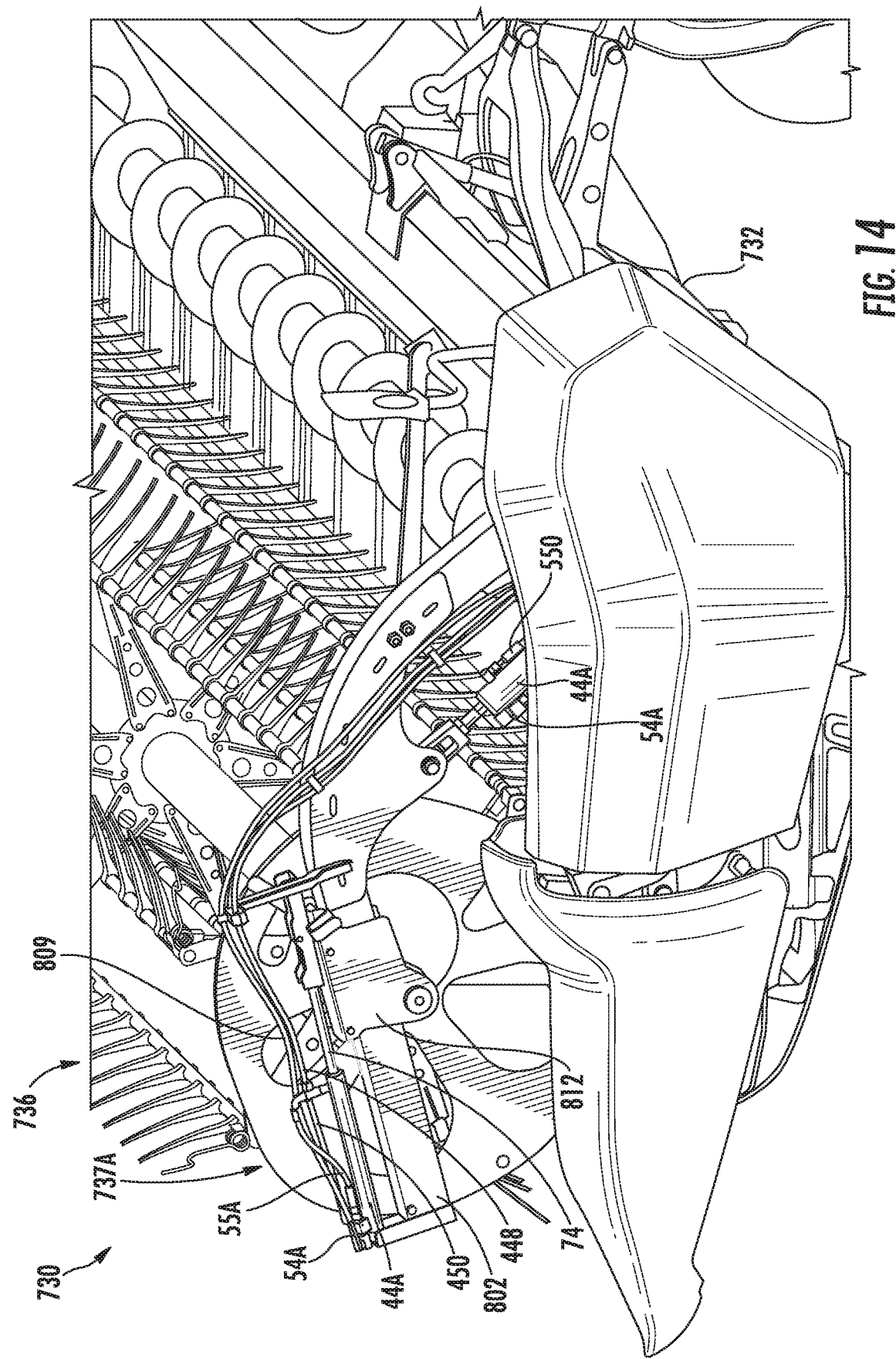
FIG. 14 is an enlarged fragmentary perspective view of a portion of the harvester head of FIG. 10.

FIGS. 14 and 15 illustrate the connection of cylinders 44 of positioning system 742. As shown by FIG. 14, reel segment 737A comprises a carrier sleeve 812 which supports the remainder of reel segment 737A and which is slidable along guide bar 802. Cylinder 44 has a cylinder end mounted to an end of outer guide bar 802 and a rod 74 connected to carrier sleeve 812 which is slidable along guide bar 802. Retraction of rod 74 pulls carrier sleeve 812 and the carried reel segment 737A in a forward direction from the extreme aft position shown in FIG. 14.

As shown by FIG. 15, reel segment 837A comprises a carrier sleeve 832 which supports the remainder of reel segment 837A and which is slidably supported along inner guide bar 803. Hydraulic cylinder 44B has a cylinder end 814 pinned to a bracket mounted to guide bar 803. Cylinder 44B has its rod 74 pinned to a weldment 815 that is fixed to carrier sleeve 832. Extension of rod 74 pushes carrier sleeve 832 and the carried reel segment 737A (as well as the left side of segment 737B) in a forward direction from the extreme aft position shown in FIG. 14.

FIG. 15 further illustrates sensor 280 of positioning system 741. Sensor 280 comprises slot 830 and rotational sensor 832. Slot 830 extends along guide bar 803. Slot 830 is inclined toward a forward end of guide bar 803. Rotational sensor 832 is carried by carrier sleeve 816 and comprises a pin 836 which is received within slot 830. As carrier 3816 moves along guide bar 803, pin 836 rides within slot 830. The slope or inclination of slot 830 pivots or rotates pin 836, wherein the pivoting or rotation of pin 836 is sensed by rotational sensor 832 which output signals to controller 760 indicating the fore-aft positioning of carrier sleeve 816 and reel segment 837A along guide bar 803. The signals output by rotational sensor 832 based upon the angular position of pin 836, which are dependent upon its position along slot 830, indicate the corresponding position of cylinder 44B and indicate whether cylinder 44B is at an end of stroke position. In one implementation, rotational sensor 832 may comprise a rotary Hall effect sensor. In other implementations, sensor 280 of positioning system 742 may have other configurations.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester head comprising:
a frame;
a position adjustable reel movably supported by the frame;
a hydraulic supply comprising a pump and a reservoir;
a first hydraulic cylinder comprising a first barrel housing a first displaceable piston separating an interior of the first barrel into first side and a second side, the first displaceable piston having a first rod connected to a first portion of the reel;
a second hydraulic cylinder comprising a second barrel housing a second displaceable piston separating an interior of the second barrel into a first side and a second side, the second displaceable piston having a second rod connected to a second portion of the reel;
a first hydraulic fluid line connecting the hydraulic supply to the first side of the first hydraulic cylinder;
a second hydraulic fluid line connecting the second side of the first hydraulic cylinder to the first side of the second hydraulic cylinder;
a first selectively actuatable rephasing valve fluidly coupling the first side of the first hydraulic cylinder to the first side of the second hydraulic cylinder;
a third hydraulic fluid line connecting the second side of the second hydraulic cylinder to the hydraulic supply;
a second selectively actuatable rephasing valve fluidly coupling the first side of the second hydraulic cylinder to hydraulic supply; and
a controller to selectively open and close the first selectively actuatable rephasing valve and the second selectively actuatable rephasing valve to re-phase the first displaceable piston and the second displaceable piston with respect to one another.

2. The harvester head of claim 1, wherein the first rod and the second rod are connected to the first portion and the second portion, respectively, of the reel such that extension of the first rod moves the reel in a first direction and extension of the second rod moves the reel in a second direction opposite the first direction, wherein the first side of the first hydraulic cylinder comprises a rod side of the piston and wherein the first side of the second hydraulic cylinder comprises a cap side of the piston.

3. The harvester head of claim 2, wherein the first direction is a forward direction and wherein the second direction is a rearward direction.

4. The harvester head of claim 2, wherein the first direction is an upwards direction and wherein the second direction is a downward direction.

5. The harvester head of claim 1 further comprising a sensor on the first hydraulic cylinder to output a signal to the controller indicating a position of the first piston.

6. The harvester head of claim 5 further comprising a second sensor on the second hydraulic cylinder to output a signal to the controller indicating the position of the second piston, wherein the controller is to initiate rephasing of the first piston and the second piston based upon signals from the first sensor and the second sensor.

7. The harvester head of claim 6, wherein the controller is to initiate rephasing of the first piston and the second piston based upon signals from the first sensor and the second sensor while neither of the first piston nor the second piston is at an end of stroke position.

8. The harvester head of claim 7, wherein the controller is to automatically initiate rephasing of the first piston and the second piston based upon a comparison of a position of the first piston and a position of the second piston.

9. An agricultural hydraulic cylinder rephasing system comprising:
a hydraulic supply comprising a pump and a reservoir;
a first hydraulic cylinder comprising a first barrel housing a first displaceable piston separating an interior of the first barrel into a rod side and a cap side, the first displaceable piston having a first rod connected to a first portion of a reel;
a second hydraulic cylinder comprising a second barrel housing a second displaceable piston separating an interior of the second barrel into a rod side and a cap side, the second displaceable piston having a second rod connected to a second portion of the reel;
a first hydraulic fluid line connecting the hydraulic supply to the rod side of the first hydraulic cylinder;
a second hydraulic fluid line connecting: (a) the cap side of the first hydraulic cylinder to the cap side of the second hydraulic cylinder or (b) the rod side of the first hydraulic cylinder to the rod side of the second hydraulic cylinder;
a first selectively actuatable rephasing valve fluidly coupling: (a) the rod side of the first hydraulic cylinder to the cap side of the second hydraulic cylinder when the second hydraulic fluid line is connecting the cap side of the first hydraulic cylinder to the cap side of the second hydraulic cylinder or (b) the cap side of the first hydraulic cylinder to the rod side of the second hydraulic cylinder when the second hydraulic fluid line is connecting the rod side of the first hydraulic cylinder to the rod side of the second hydraulic cylinder;
a second selectively actuatable rephasing valve fluidly coupling: (a) the cap side of the second hydraulic cylinder to the hydraulic supply when the second hydraulic fluid line is connecting the cap side of the first hydraulic cylinder to the cap side of the second hydraulic cylinder or (b) the rod side of the second hydraulic cylinder to the hydraulic supply when the second hydraulic fluid line is connecting the rod side of the first hydraulic cylinder to the rod side of the second hydraulic cylinder;
a sensor to sense a position of one of the first displaceable piston and the second displaceable piston; and
a controller to selectively actuate the first rephasing valve and the second rephasing valve based upon signals from the sensor.

10. The system of claim 9, wherein the first rod and the second rod are connected to the first portion and the second portion, respectively, of the reel such that extension of the first rod moves the reel in a first direction and extension of the second rod moves the reel in a second direction opposite the first direction, wherein said one of the cap side and the rod side comprises the cap side.

11. The system of claim 10, wherein the first direction is a forward direction and wherein the second direction is a rearward direction.

12. The system of claim 10, wherein the first direction is an upwards direction and wherein the second direction is a downward direction.

13. The system of claim 9 further comprising a second sensor, wherein the sensor senses a position of the first displaceable piston and wherein the second sensor senses a position of the second displaceable piston, wherein the controller is to selectively actuate the first rephasing valve and the second rephasing valve based upon signals from the sensor and the second sensor.

14. The system of claim 13, wherein the controller is to initiate rephasing of the first piston and the second piston based upon signals from the sensor and the second sensor while neither of the first piston nor the second piston is at an end of stroke position.

* * * * *